United States Patent
Iwasa

(10) Patent No.: US 11,302,321 B2
(45) Date of Patent: Apr. 12, 2022

(54) AUDIO-BASED OPERATION SYSTEM, METHOD OF PROCESSING INFORMATION USING AUDIO-BASED OPERATION AND STORAGE MEDIUM

(71) Applicant: Ricoh Company, Ltd., Tokyo (JP)

(72) Inventor: Keisuke Iwasa, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 167 days.

(21) Appl. No.: 16/676,507

(22) Filed: Nov. 7, 2019

(65) Prior Publication Data

US 2020/0175984 A1 Jun. 4, 2020

(30) Foreign Application Priority Data

Nov. 30, 2018 (JP) .............................. JP2018-225819

(51) Int. Cl.
*G10L 15/00* (2013.01)
*G06F 3/16* (2006.01)
*G10L 15/22* (2006.01)
*G10L 15/30* (2013.01)
*H04N 1/00* (2006.01)

(52) U.S. Cl.
CPC ............. *G10L 15/22* (2013.01); *G06F 3/167* (2013.01); *G10L 15/30* (2013.01); *H04N 1/00403* (2013.01); *H04N 1/00408* (2013.01); *G10L 2015/223* (2013.01)

(58) Field of Classification Search
USPC ............... 345/171; 358/1.1–3.29, 1.11–1.18; 704/1–10, 200–277; 382/155–159
See application file for complete search history.

(56) References Cited

U.S. PATENT DOCUMENTS 10,817,673 B2 * 10/2020 Lebeau ................... G10L 13/00
2011/0058189 A1 * 3/2011 Kuwamura ........ G03G 15/5087
358/1.9

(Continued)

FOREIGN PATENT DOCUMENTS

CN 104580800 A 4/2015
CN 105049659 A 11/2015

(Continued)

OTHER PUBLICATIONS

Chinese Office Action dated Jul. 22, 2021, in corresponding Chinese Patent Application No. CN201911202367.0.

*Primary Examiner* — Marcellus J Augustin
(74) *Attorney, Agent, or Firm* — Xsensus LLP

(57) ABSTRACT

An audio-based operation system includes an audio input-output device that receives an audio-based operation performed by a user, a server that receives an instruction corresponding the audio-based operation received by the audio input-output device, an image forming apparatus that executes a job transmitted from the server. The server includes circuitry configured to receive audio-based operation information indicating the audio-based operation received by the audio input-output device, convert the received audio-based operation information into a job interpretable by the image forming apparatus, and instruct the image forming apparatus to execute the job converted from the audio-based operation information.

10 Claims, 30 Drawing Sheets

(56) References Cited

U.S. PATENT DOCUMENTS

| | | | | |
|---|---|---|---|---|
| 2014/0043630 A1* | 2/2014 | Buser | ............... | H04N 1/00278 |
| | | | | 358/1.13 |
| 2015/0109631 A1 | 4/2015 | Hayano | | |
| 2015/0317109 A1 | 11/2015 | Kirihata | | |
| 2015/0379986 A1* | 12/2015 | Golding | ............... | G10L 15/08 |
| | | | | 704/246 |
| 2018/0285059 A1* | 10/2018 | Zurek | ............... | H04L 12/1822 |
| 2018/0288248 A1 | 10/2018 | Shen et al. | | |
| 2019/0080692 A1* | 3/2019 | R | ............... | G10L 17/00 |
| 2019/0304453 A1 | 10/2019 | Nakamura | | |

FOREIGN PATENT DOCUMENTS

| | | |
|---|---|---|
| CN | 206332735 U | 7/2017 |
| CN | 108656558 A | 10/2018 |
| JP | 2007-193138 | 8/2007 |

\* cited by examiner

FIG. 9

| printColor | |
|---|---|
| ☑Define synonyms ⓘ ☐Allow automated expansion | |
| auto_color | auto_color |
| monochrome | monochrome, black and white |
| color | color, full color |
| two_color | two color |
| single color | single color |
| red_and_black | red and black |

FIG. 10A

| |
|---|
| ″ Add USER expression |

| |
|---|
| ″ Please copy this by setting of two color, double sides and 2 in 1. |
| ″ Please copy this document by setting of Tray 1, fitting, and double sides. |
| ″ Make two copies of this document by monochrome and dark. |
| ″ Make three copies with 4 in 1. |
| ″ Execute copy by setting of color and auto tray. |
| ″ Please Copy this document with 80% on Tray 1. |
| ″ Copy dark on one side. |
| ″ copy by black and white and dark. |

FIG. 10B

Action

| |
|---|
| copy |

RELATED PARAMETER

FIG. 10C

Entity

| | Entity | ENTITY ⓘ | VALUE |
|---|---|---|---|
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

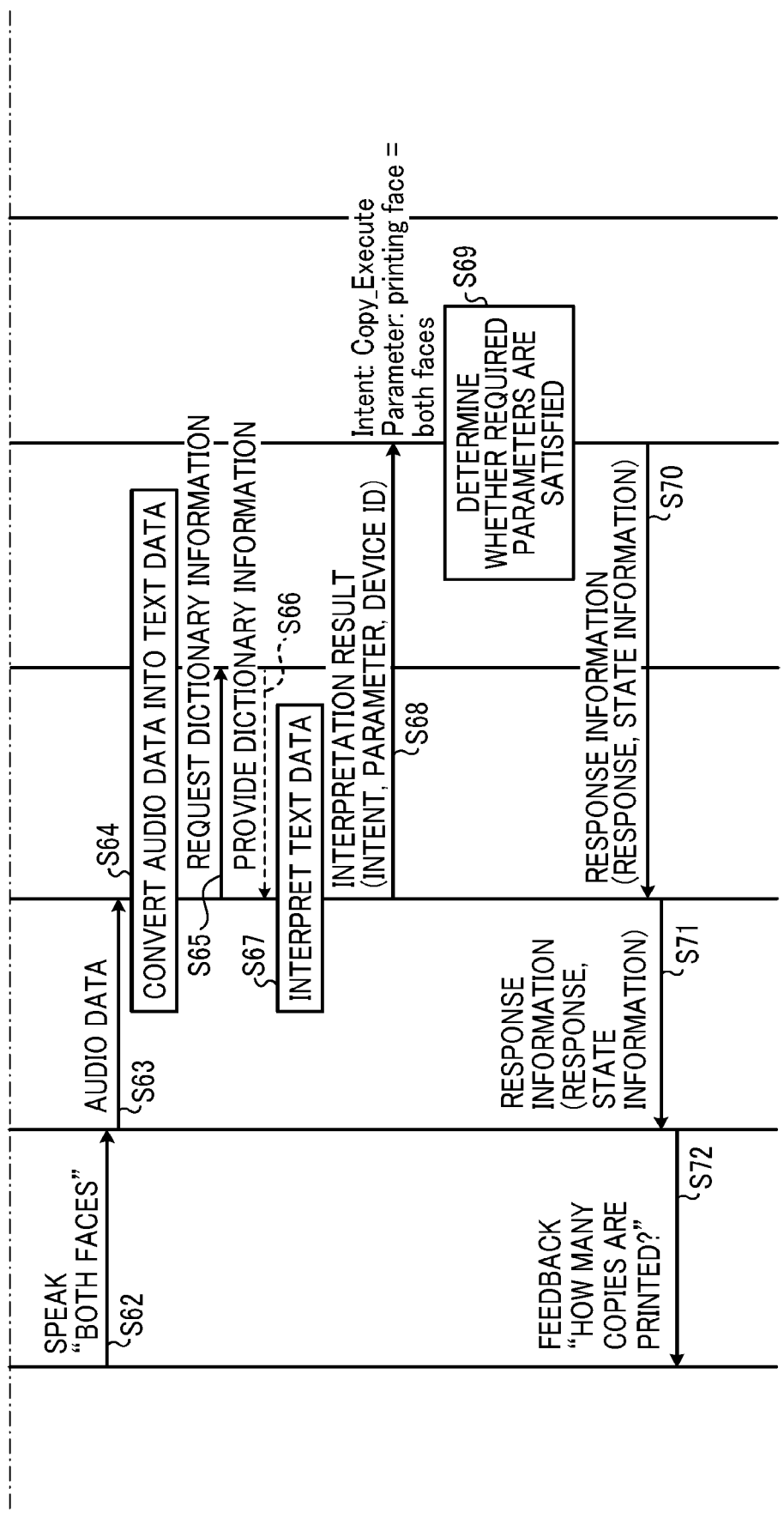

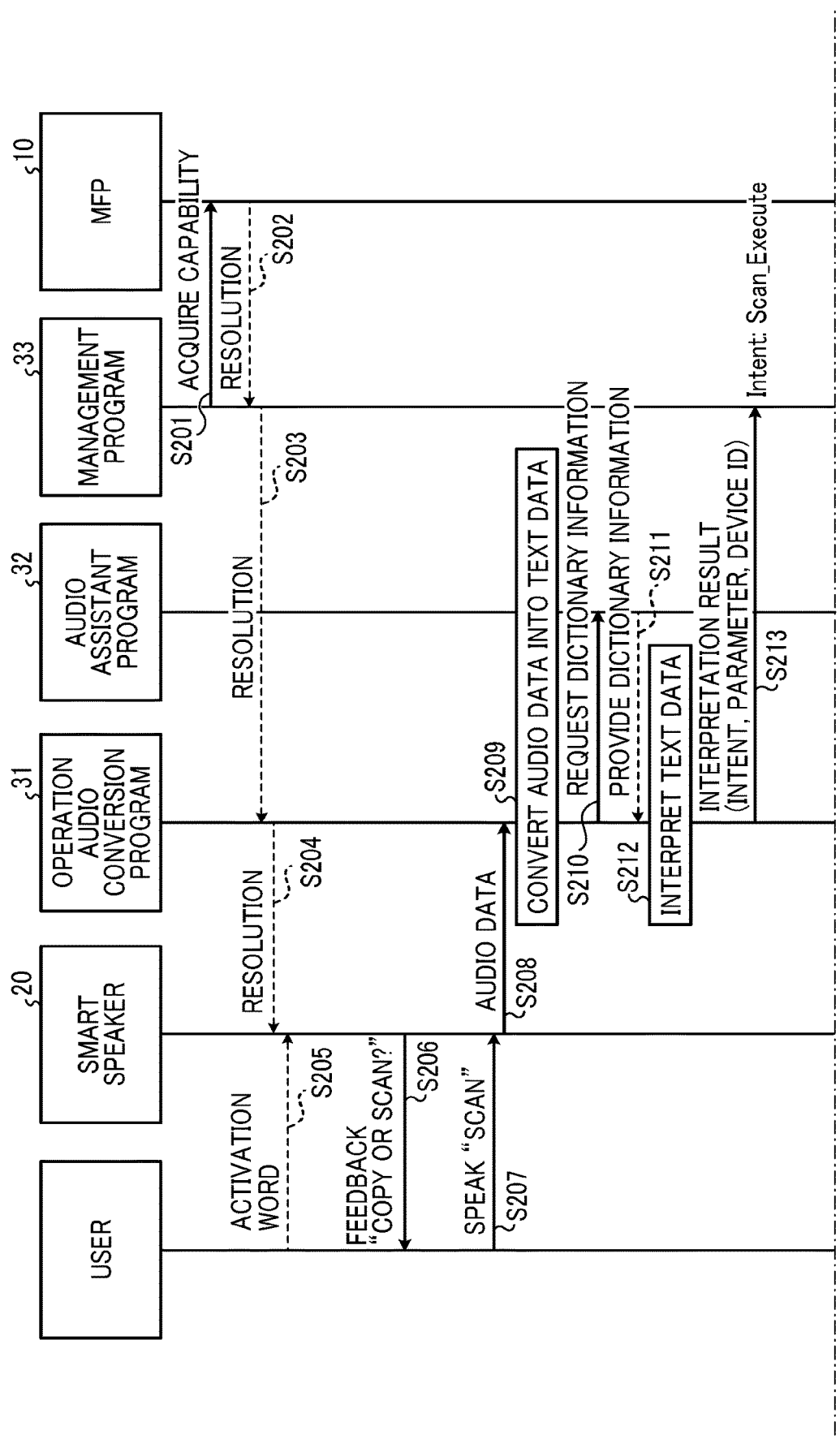

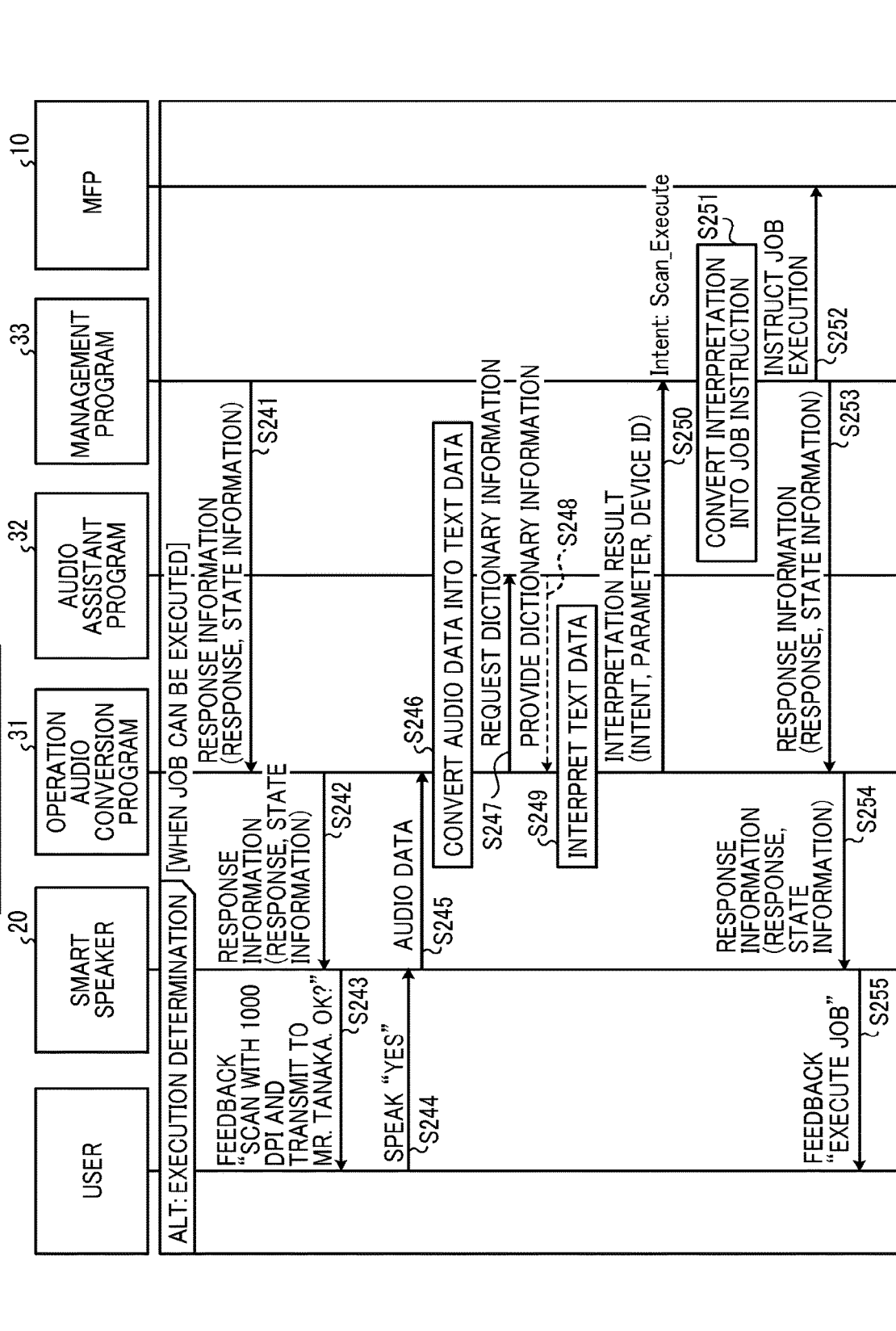

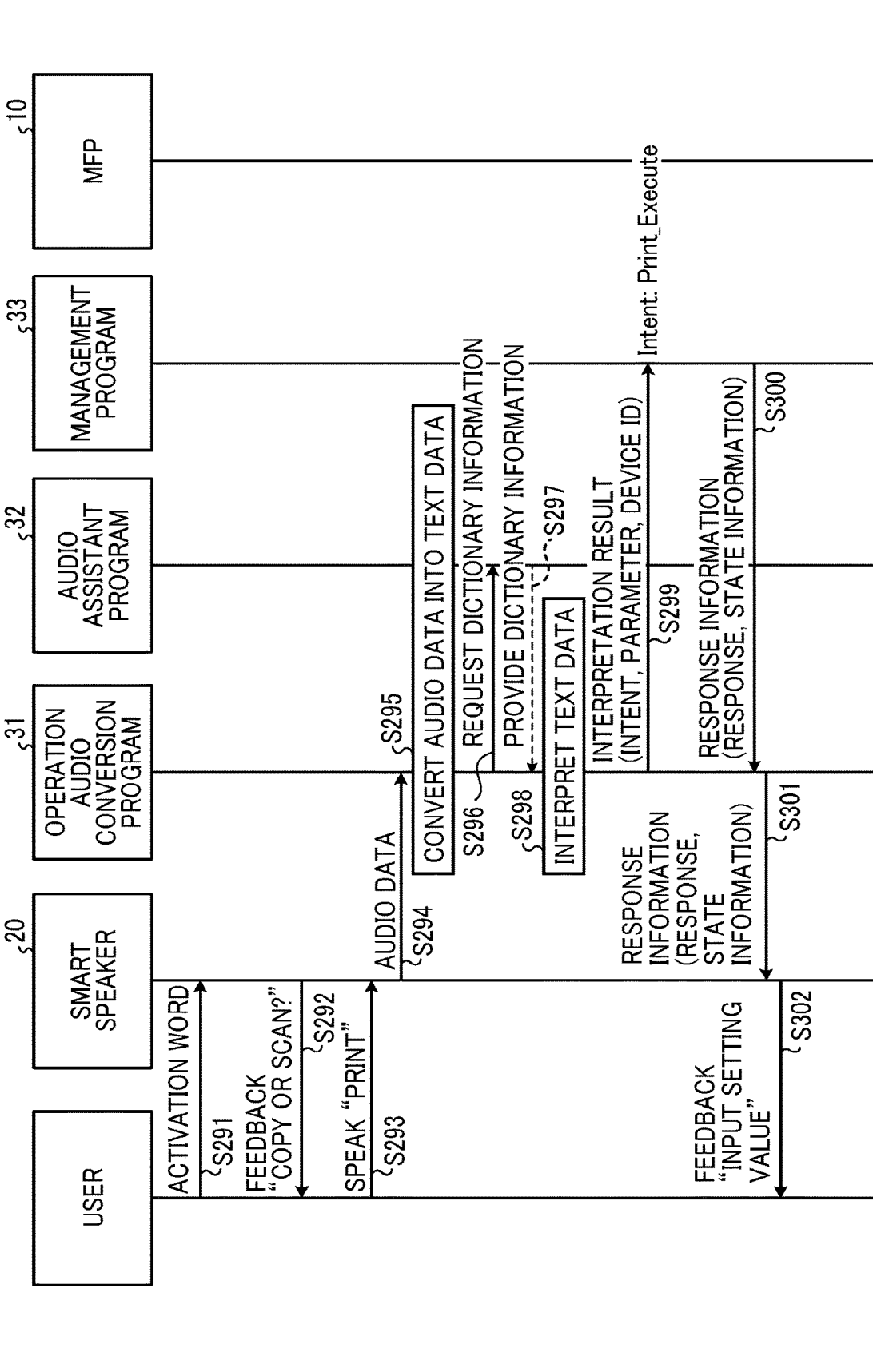

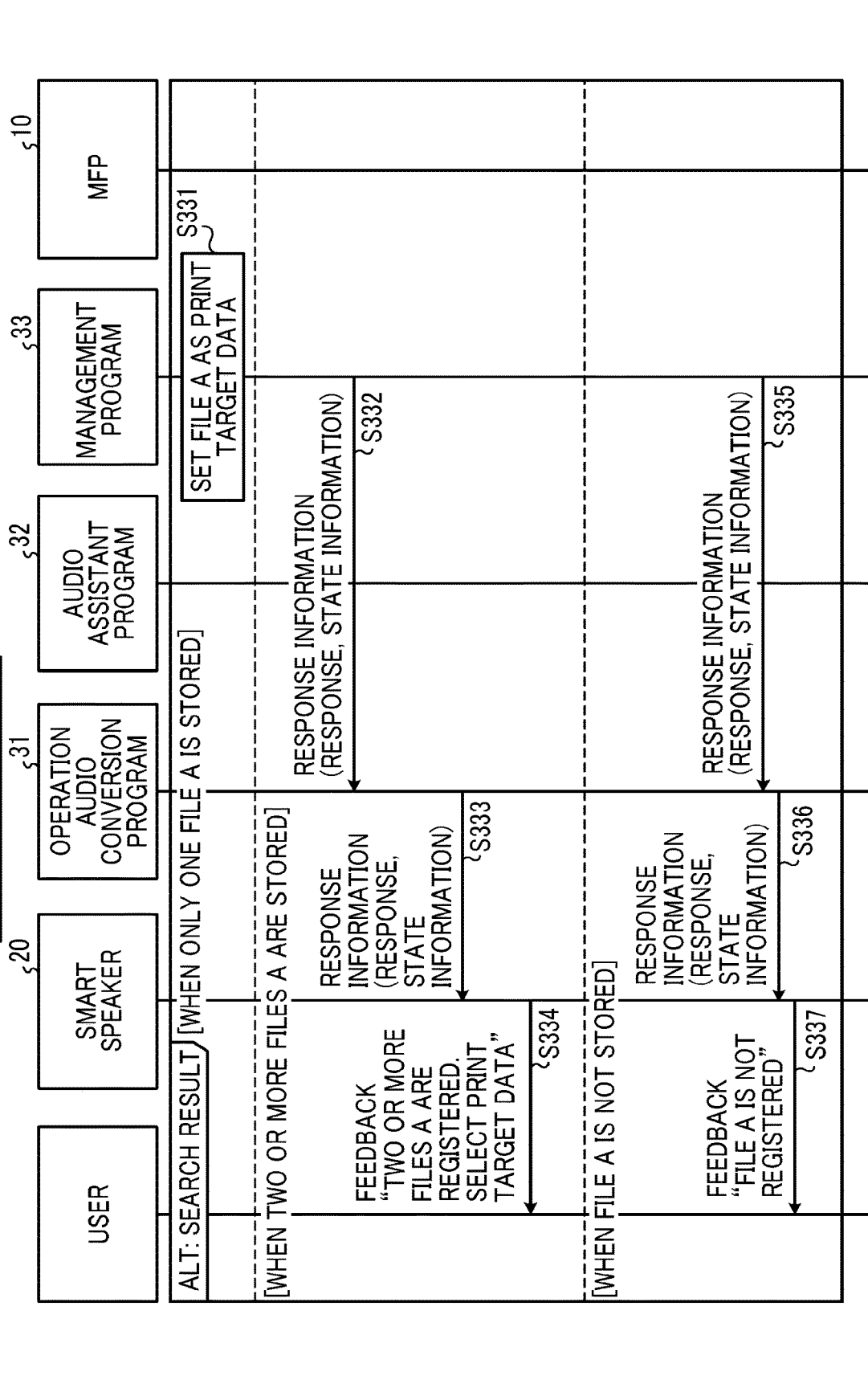

AUDIO-BASED OPERATION SYSTEM, METHOD OF PROCESSING INFORMATION USING AUDIO-BASED OPERATION AND STORAGE MEDIUM

CROSS-REFERENCE TO RELATED APPLICATION

This application claims priority pursuant to 35 U.S.C. § 119(a) to Japanese Patent Application No. 2018-225819, filed on Nov. 30, 2018 in the Japan Patent Office, the disclosure of which is incorporated by reference herein in its entirety.

BACKGROUND

Technical Field

This disclosure relates to an audio-based operation system, a method of processing information using an audio-based operation, and a storage medium.

Background Art

Smart speakers used for operating various devices or apparatuses are known, in which information retrieval can be performed using an interactive audio-based operation performable using the smart speakers. Image forming apparatuses, such as multifunction peripherals (MFPs), are operated manually by users using graphical user interfaces (GUIs). Conventionally, image forming apparatuses cannot receive an operation from smart speakers.

SUMMARY

As one aspect of the present disclosure, an audio-based operation system is devised. The audio-based operation system includes an audio input-output device that receives an audio-based operation performed by a user, a server that receives an instruction corresponding the audio-based operation received by the audio input-output device, and an image forming apparatus that executes a job transmitted from the server. The server includes circuitry configured to receive audio-based operation information indicating the audio-based operation received by the audio input-output device, convert the received audio-based operation information into a job interpretable by the image forming apparatus, and instruct the image forming apparatus to execute the job converted from the audio-based operation information.

As another aspect of the present disclosure, a method of processing information using an audio-based operation is devised. The method includes receiving audio-based operation information indicating an audio-based operation received by an audio input-output device, converting the received audio-based operation information into a job interpretable by an image forming apparatus, and instructing the image forming apparatus to execute the job converted from the audio-based operation information.

A non-transitory computer readable storage medium storing one or more instructions that, when performed by one or more processors, cause the one or more processors to execute a method of processing information using an audio-based operation is devised. The method includes receiving audio-based operation information indicating an audio-based operation received by an audio input-output device, converting the received audio-based operation information into a job interpretable by an image forming apparatus, and instructing the image forming apparatus to execute the job converted from the audio-based operation information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 9 is an example of entity information;

FIGS. 10A to 10C are an example of entity information registered based on a spoken phrase;

FIGS. 13A and 13B (FIG. 13) are an example of a sequence diagram of a flow of a copy setting process by audio-based operation executed by the audio-based operation system according to the embodiment;

FIGS. 18A and 18B (FIG. 18) are an example of a sequence diagram illustrating a flow of determining whether an MFP has apparatus capability required for a to-be-executed job;

FIGS. 19A and 19B (FIG. 19) are an example of a sequence diagram of a flow of operation when a job can be executed and when a job cannot be executed by the audio-based operation system according to the embodiment;

FIGS. 20A and 20B (FIG. 20) are an example of a sequence diagram of a flow of a search processing by audio-based operation executed by the audio-based operation system according to the embodiment;

FIGS. 21A and 21B (FIG. 21) are an example of a sequence diagram of a flow of a printing process by audio-based operation executed by the audio-based operation system according to the embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an audio-based operation system, an audio-based operation method, and an audio-based operation program with reference to the accompanying drawings. One or more embodiments to be described below are just examples of the audio-based operation system, the audio-based operation method, and the audio-based operation program, and the configuration and specifications thereof are not limited to those described below.

Figure 1:
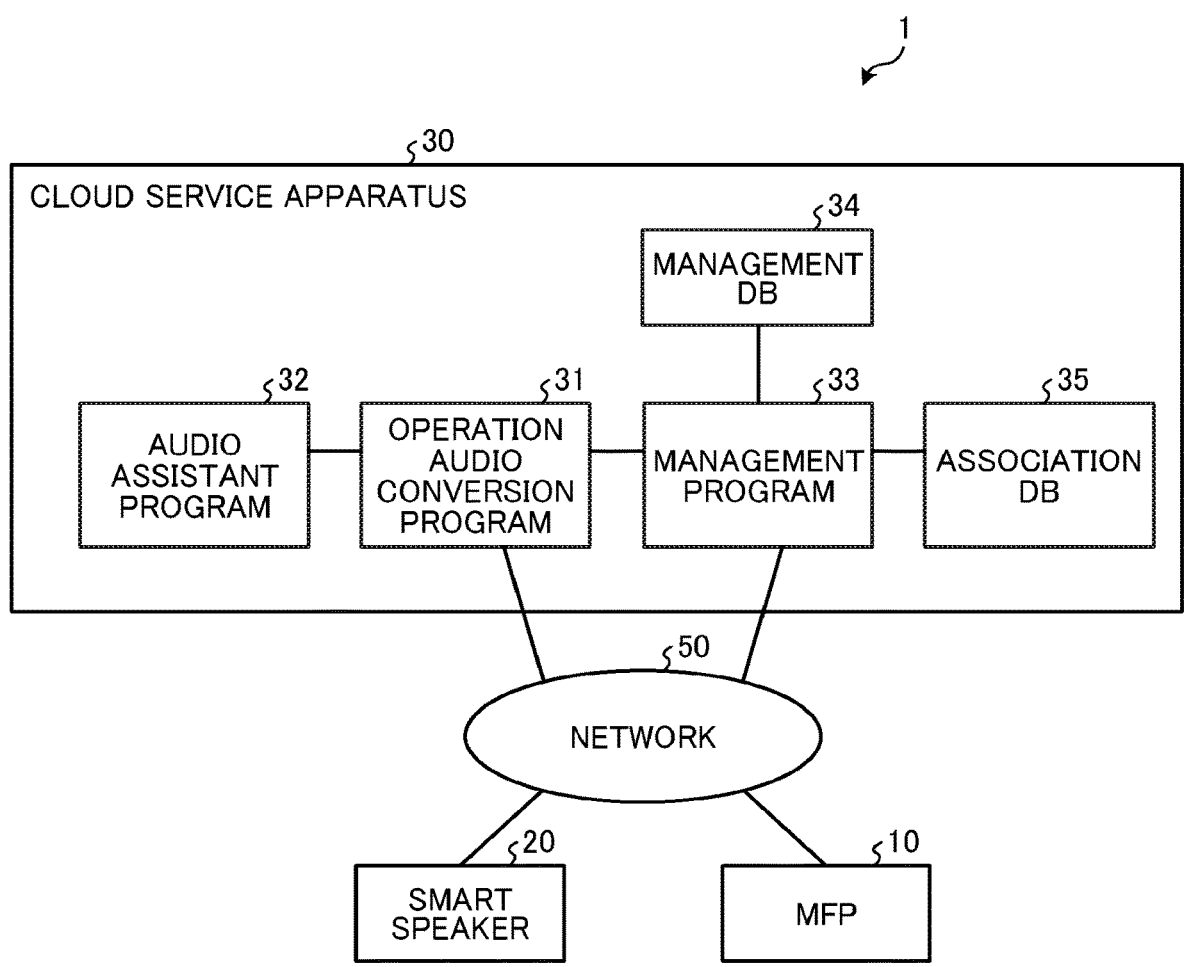
FIG. 1 is an example system configuration of an audio-based operation system according to an embodiment.

System Configuration:

FIG. 1 is an example system configuration of an audio-based operation system according to an embodiment of the present disclosure. As illustrated in FIG. 1, the audio-based operation system 1 includes, for example, one or more smart speakers 20, a cloud service apparatus 30, and one or more target apparatuses, such as multifunction peripheral apparatuses (MFPs) 10. The MFP 10, the smart speaker 20, and the cloud service apparatus 30 are connected to each other via a network 50, such as local area network (LAN).

The smart speaker 20 is a speaker that performs input and output of various information by interacting with a user. In the embodiment, the smart speaker 20 is described as an example, but other devices, such as smartphone, tablet device, personal computer, or the like can be used. The smart speaker 20 receives an audio input from the user to operate the MFP 10 using the audio, such as voice input of user. In this description, the audio may be voice spoken by a user, but is not limited thereto. Further, the smart speaker 20 can be configured to output an audio to the user. Further, the smart speaker 20 performs data communication with the cloud service apparatus 30, such as transmission and reception of audio data, text data, image data, or the like. In this description, the smart speaker 20 can be used as an audio input-output device.

The cloud service apparatus 30 can consists of one or more servers. The cloud service apparatus 30 analyzes audio data received from the smart speaker 20 and converts the audio data into text data. Further, the cloud service apparatus 30 interprets an intention of a user based on the text data and pre-registered dictionary information, converts an interpretation result into a job execution instruction interpretable by the MFP 10, and transmits the job execution instruction to the MFP 10. Further, as indicated in FIG. 1, the cloud service apparatus 30 includes, for example, an operation audio conversion program 31, an audio assistant program 32, a management program 33, a management database (DB) 34, and an association database (DB) 35. The details of these will be described later.

The MFP 10 is a multifunction apparatus equipped with a plurality of functions such as a printer function and a scanner function. That is, the MFP 10 is an image forming apparatus. The MFP 10 executes a job execution instruction transmitted from the cloud service apparatus 30. The MFP 10 is an example of target apparatus or communication target apparatus in this description.

Figure 2:
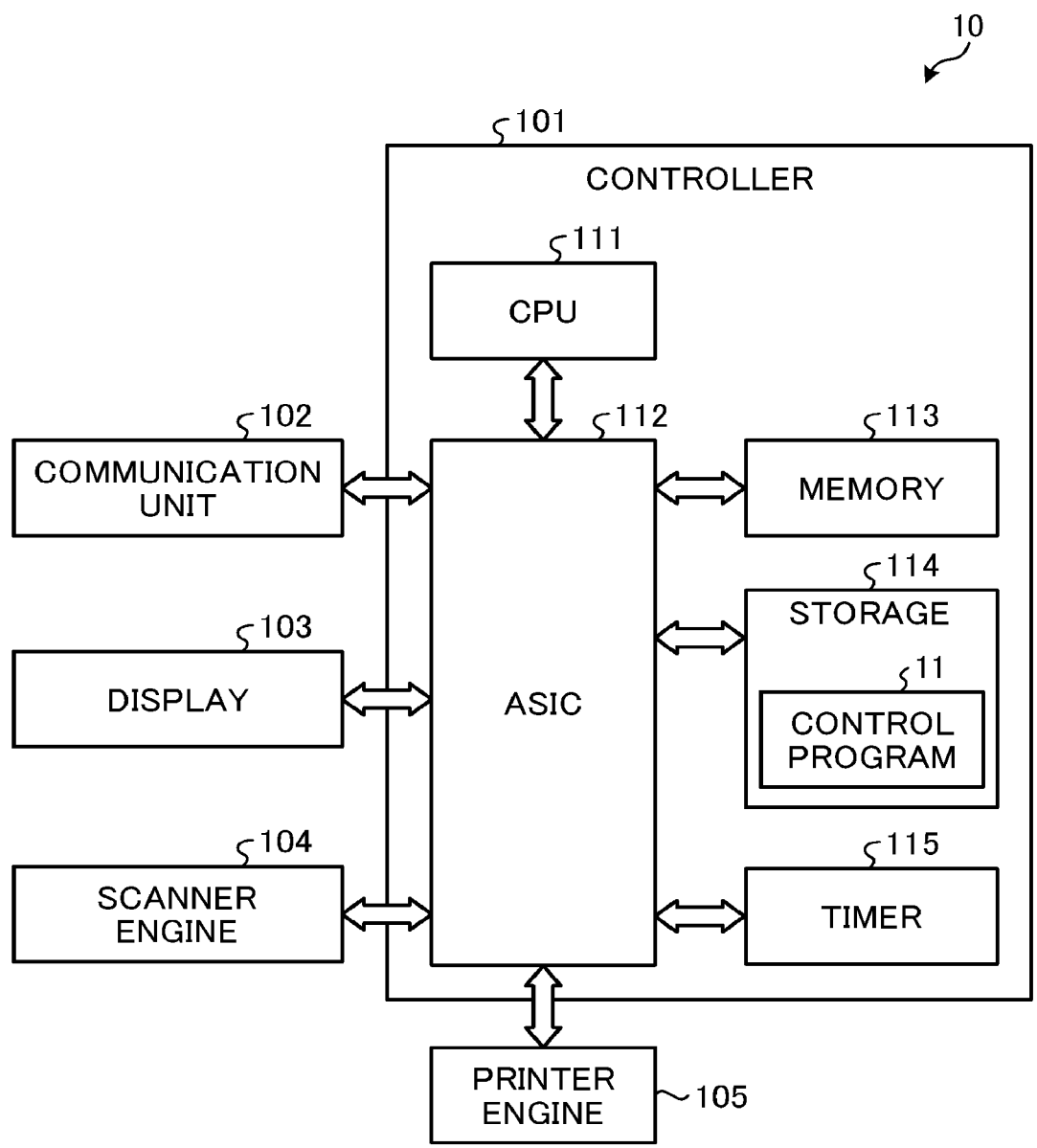
FIG. 2 is an example block diagram of hardware configuration of an MFP.

Hardware Configuration of MFP:

FIG. 2 is an example block diagram of hardware configuration of the MFP 10. The MFP 10 includes, for example, a controller 101, a communication unit 102, a display 103, a scanner engine 104, and a printer engine 105.

The controller 101 includes, for example, a central processing unit (CPU) 111, an application specific integrated circuit (ASIC) 112, a memory 113, a storage 114, and a timer 115. Each of these units is connected to each other via a bus line.

The CPU 111 controls the MFP 10 entirely. The ASIC 112 is, for example, a large scale integrated circuit (LSI). The ASIC 112, which is a large-scale integrated circuit (LSI), performs various image processing necessary for images processed by the scanner engine 104 and the printer engine 105.

The memory 113 is a volatile semiconductor memory that temporarily stores program and data. The storage 114 is, for example, a storage device such as a hard disk drive (HDD) or a solid-state drive (SSD). For example, the storage 114 stores a management program 11 or the like. The management program 11 is a program that controls the execution of a characteristic function provided by the MFP 10. The timer 115 measures the time.

The communication unit 102 performs communication with each device connected to the network 50. The communication unit 102 acquires a job execution instruction, such as a scan instruction or a print instruction.

The display 103 is, for example, a touch panel integrating a liquid crystal display (LCD) and a touch sensor. When an operator (user) touches displayed operation buttons or the like, the display 103 receives the operation.

The scanner engine 104 controls a scanner unit to optically read document. The printer engine 105 controls an image writing unit to print an image on, for example, a transfer sheet.

Figure 3:
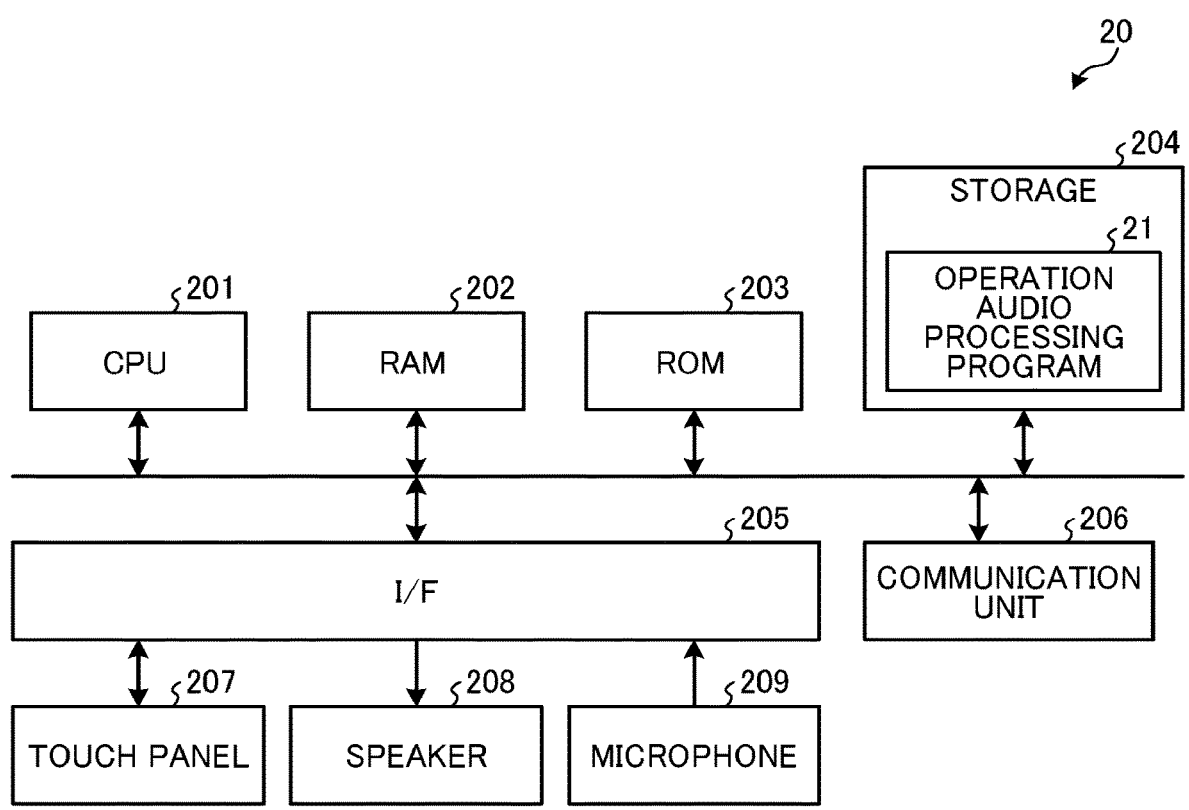
FIG. 3 is an example block diagram of hardware configuration of a smart speaker.

Hardware Configuration of Smart Speaker:

FIG. 3 is an example block diagram of hardware configuration of the smart speaker 20. As illustrated in FIG. 3, the smart speaker 20 includes, for example, a CPU 201, a random access memory (RAM) 202, a read only memory (ROM) 203, a storage 204, an interface (I/F) 205, a communication unit 206, a touch panel 207, a speaker 208, and a microphone 209. Each of these units is connected to each other via a bus line.

The CPU 201 controls the smart speaker 20 entirely. The RAM 202 is a volatile semiconductor memory that temporarily stores program and data. The ROM 203 is a nonvolatile semiconductor memory that stores programs and data.

The storage 204 is, for example, a storage device such as a flash memory. The storage 204 stores an operation audio processing program 21.

The CPU 201 executes the operation audio processing program 21 to control various processing. For example, the CPU 201 controls the acquisition of audio information from the microphone 209. The CPU 201 also controls the transmission of the acquired audio information to the cloud service apparatus 30. Further, the CPU 201 controls a display output using the touch panel 207 and the audio output using the speaker 208 for data acquired from the cloud service apparatus 30 (e.g., audio data, text data, image data).

The I/F 205 is connected to the touch panel 207, the speaker 208, and the microphone 209. The touch panel 207 is, for example, a touch panel integrating a liquid crystal display (LCD) and a touch sensor. The speaker 208 outputs audio. The microphone 209 performs audio collection (acquisition). For example, the microphone 209 acquires an input audio of a job execution instruction to be transmitted to the MFP 10. The input audio acquired by the microphone 209 is transmitted to the cloud service apparatus 30 via the communication unit 206.

The communication unit 206 performs communication with each device connected to the network 50.

Figure 4:
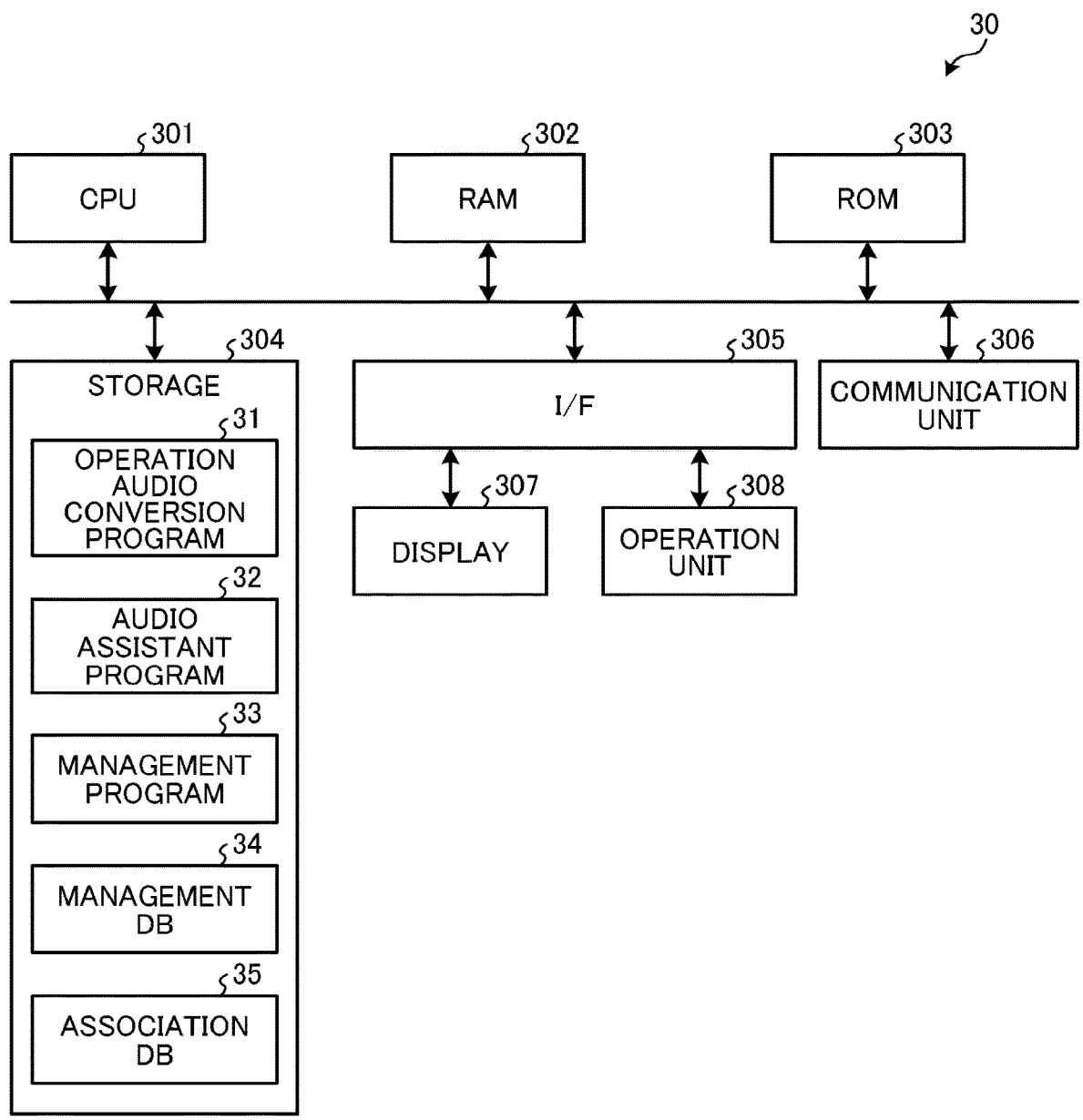
FIG. 4 is an example block diagram of hardware configuration of a cloud service apparatus.

Hardware Configuration of Cloud Service Apparatus:

FIG. 4 is an example block diagram of hardware configuration of the cloud service apparatus 30. The cloud service apparatus 30 includes, for example, a CPU 301, a RAM 302, a ROM 303, a storage 304, an interface (I/F) 305, a communication unit 306, a display 307, and an operation unit 308. Each of these units is connected to each other via a bus line.

The CPU 301 controls the cloud service apparatus 30 entirely. The CPU 301 executes program stored in the storage 304 or the like. The RAM 302 is a volatile semiconductor memory that temporarily stores program and data. The ROM 303 is a nonvolatile semiconductor memory that stores programs and data.

The storage 304 is a memory, such as hard disk drive (HDD) and solid state drive (SSD). The storage 304 stores the operation audio conversion program 31, the audio assistant program 32, and the management program 33.

The operation audio conversion program 31 converts audio data into text data, and further determines whether the text data matches pre-defined dictionary information. If the text data matches pre-defined dictionary information, the operation audio conversion program 31 converts the text data into a parameter indicating an intent and job conditions corresponding to a user intention.

The audio assistant program 32 retains the dictionary information. The management program 33 converts the intent and parameter into a job execution instruction with a format interpretable by the MFP 10, and transmits the job execution instruction to the registered MFP 10.

The operation audio conversion program 31, the audio assistant program 32, and the management program 33 can be executed by one server, or can be executed by different servers, respectively. Further, these programs can be executed by cooperating a plurality of servers.

The storage 304 stores, for example, a management DB 34 and an association DB 35 as data used by the operation audio conversion program 31, the audio assistant program 32, and the management program 33.

The management DB 34 is a database for storing data related to the content provided by the cloud service apparatus 30, such as text data, image data, and audio data.

The association DB 35 stores information indicating the MFP 10 associated with the smart speaker 20. For example, the association DB 35 stores, a device ID identifying the smart speaker 20 and an apparatus ID identifying the MFP 10 in association with each other. Further, one or both of the management DB 34 and the association DB 35 can be stored in another server accessible by the cloud service apparatus 30 via the network 50.

The I/F 305 is connected to the display 307 and the operation unit 308. The display 307 is, for example, a liquid crystal display unit (LCD). The operation unit 308 is an input device, such as a keyboard or a mouse.

The communication unit 306 performs communication with each device connected to the network 50.

Figure 5:
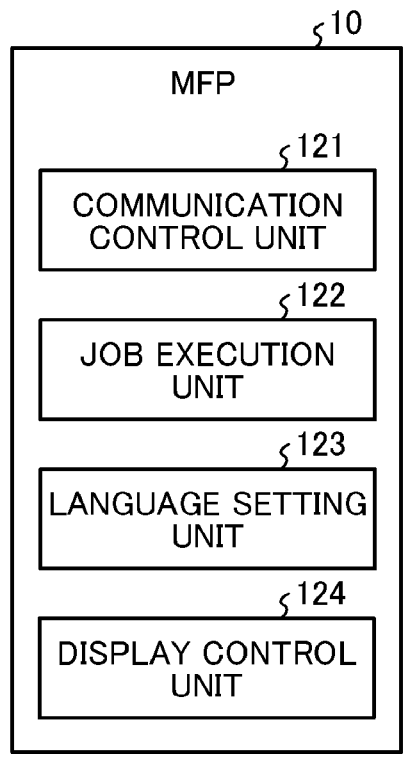
FIG. 5 is an example block diagram of a functional configuration of an multifunction peripheral apparatuses (MFP)

Functional Configuration of MFP:

FIG. 5 is an example block diagram of a functional configuration of the MFP 10. The CPU 111 of the MFP 10 executes the management program 11 stored in the storage 114 to implement functions, such as a communication control unit 121, a job execution unit 122, a language setting unit 123, and a display control unit 124 as illustrated in FIG. 5.

The communication control unit 121 controls the communication unit 102 to perform communication with each device or apparatus connected to the network 50. For example, the communication control unit 121 receives a job instruction or job execution instruction to be executed by the MFP 10 and a language type designating a language to be displayed on the MFP 10.

In response to receiving the job instruction, the job execution unit 122 performs a job indicated by the job instruction. For example, the job execution unit 122 performs the printer function and the scan function based on the job instruction.

The language setting unit 123 changes the language setting of screen to be displayed using the display 103. For example, when the communication control unit 121 receives a specific language type, the language setting unit 123 changes the language setting based on the received specific language type.

The display control unit 124 causes the display 103, provided to the MFP 10, to display a screen described in a specific language specified or identified by a specific language type used for an audio-based operation that is received by the smart speaker 20. Specifically, the display control unit 124 causes the display 103 to display the screen described in the specific language specified or identified by the language type, defined by the language setting, interpretable by the smart speaker 20.

In this example case, the communication control unit 121, the job execution unit 122, the language setting unit 123 and the display control unit 124 are implemented by the software, but a part or all of the communication control unit 121, the job execution unit 122, the language setting unit 123 and the display control unit 124 can be implemented by hardware such as integrated circuit (IC). Further, the functions implemented by the communication control unit 121, the job execution unit 122, the language setting unit 123 and the display control unit 124 can be implemented by the management program 11 alone, a part of the functions implemented by the communication control unit 121, the job execution unit 122, the language setting unit 123 and the display control unit 124 can be implemented by using other programs, or the functions implemented by the communication control unit 121, the job execution unit 122, the language setting unit 123 and the display control unit 124 can be implemented indirectly by executing other programs.

Figure 6:
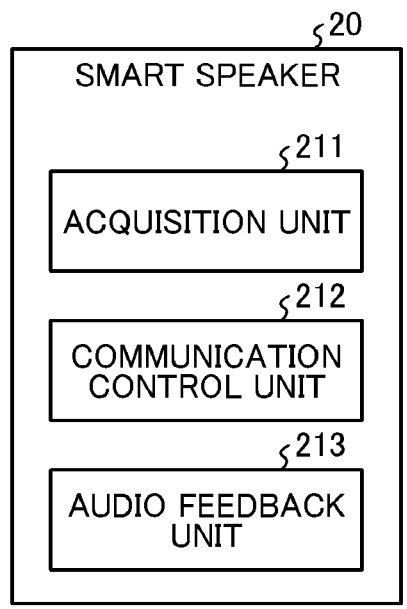
FIG. 6 is an example block diagram of a functional configuration of a smart speaker.

Functional Configuration of Smart Speaker:

FIG. 6 is an example block diagram of a functional configuration of the smart speaker 20. The CPU 201 of the smart speaker 20 executes the operation audio processing program 21 stored in the storage 204 to implement functions, such as an acquisition unit 211, a communication control unit 212, and an audio feedback unit 213 as illustrated in FIG. 6.

The acquisition unit 211 acquires an audio instruction spoken by a user who operates the MFP 10 via the microphone 209. Further, the acquisition unit 211 can be configured to acquire a user operation via the touch panel 207 and physical switch, other than the microphone 209.

The communication control unit 212 controls communication between the smart speaker 20 and the cloud service apparatus 30. The communication control unit 212 transmits the information acquired by the acquisition unit 211 to the cloud service apparatus 30, and acquires text data, image data, and/or audio data from the cloud service apparatus 30. Further, when the communication control unit 212 transmits the information acquired by the acquisition unit 211 to the cloud service apparatus 30, the communication control unit 212 may transmit the device ID identifying the smart speaker 20 to the cloud service apparatus 30.

To implement an interactive audio-based operation, the audio feedback unit 213 controls the speaker 208 to provide audio feedback to a user, such as outputting audio (e.g., sound). For example, the audio feedback unit 213 feeds back an audio to demand or prompt an audio input which can solve the situation of insufficient data, or feeds back an audio to check or confirm the audio input, input by a user. Further, the audio feedback unit 213 may control the touch panel 207 to feedback text or image to a user.

In this example case, the acquisition unit 211, the communication control unit 212 and the audio feedback unit 213 are implemented by the software, but a part or all of the acquisition unit 211, the communication control unit 212 and the audio feedback unit 213 can be implemented by hardware such as integrated circuit (IC). Further, the functions implemented by the acquisition unit 211, the communication control unit 212 and the audio feedback unit 213 can be implemented by the operation audio conversion program 31 alone, a part of the functions implemented by the acquisition unit 211, the communication control unit 212 and the audio feedback unit 213 can be implemented by using other programs, or the functions implemented by the acquisition unit 211, the communication control unit 212 and the audio feedback unit 213 can be implemented indirectly by executing other programs.

Figure 7:
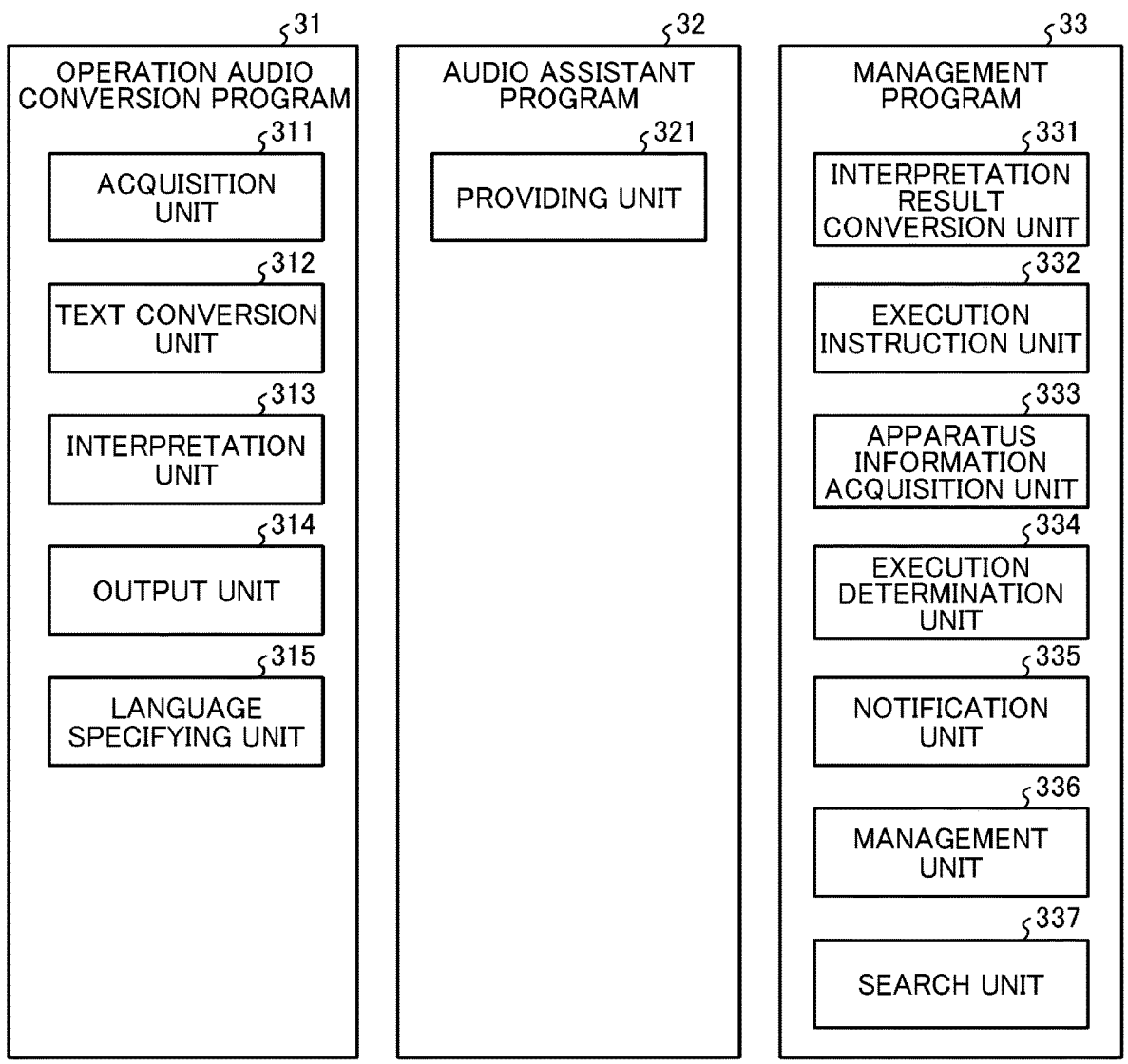
FIG. 7 is an example block diagram of a functional configuration of a cloud service apparatus.

Functional Configuration of Cloud Service Apparatus:

FIG. 7 is an example block diagram of a functional configuration of the cloud service apparatus 30. The CPU 301 of the cloud service apparatus 30 executes the operation audio conversion program 31 stored in the storage 304 to implement functions, such as an acquisition unit 311, a text conversion unit 312, an interpretation unit 313, an output unit 314, and a language specifying unit 315 as illustrated in FIG. 7.

The acquisition unit 311 receives audio-based operation information, such as audio data indicating an audio-based operation performed by a user and received by the smart speaker 20. That is, the acquisition unit 311 acquires the audio data, input by the user at the smart speaker 20 and then transmitted from the smart speaker 20. Further, the acquisition unit 311 can also acquire a user operation that is performed to a button and a switch on the touch panel 207 of the smart speaker 20, in addition to the audio data.

The text conversion unit 312 converts the audio data, input by the user, into text data.

The interpretation unit 313 interprets an instruction input by a user based on text data. Specifically, the interpretation unit 313 refers to the dictionary information provided by the audio assistant program 32 to determine whether or not a phrase (e.g., word) included in the text data matches the dictionary information. When the phrase (e.g., word) matches the dictionary information, the interpretation unit 313 converts the phrase (e.g., word) to a parameter indicating variables, such as an intent and a job condition corresponding to an intention of user. The interpretation unit 313 transmits the intent and the parameter to the management program 33 with the device ID identifying the smart speaker 20, which is the acquisition source of audio data. Hereinafter, the parameter indicates one or more parameters, the intent indicates one or more intents, and the job condition indicates one or more job conditions.

The output unit 314 controls the communication unit 306 to perform communication. For example, the output unit 314 performs transmission of data, such as text data, audio data, image data, or the like, to the smart speaker 20.

The language specifying unit 315 specifies a language type used for audio-based operation received by the smart speaker 20. Then, the MFP 10 displays a screen in which various phrases are described using the language defined by the language type used for audio-based operation received by the smart speaker 20. That is, the language specifying unit 315 specifies the language type used for the screen to be displayed on the MFP 10.

In this example case, the acquisition unit 311, the text conversion unit 312, the interpretation unit 313, the output unit 314 and the language specifying unit 315 are implemented by the software, but a part or all of the acquisition unit 311, the text conversion unit 312, the interpretation unit 313, the output unit 314 and the language specifying unit 315 can be implemented by hardware such as integrated circuit (IC). Further, the functions implemented by the acquisition unit 311, the text conversion unit 312, the interpretation unit 313, the output unit 314 and the language specifying unit 315 can be implemented by the operation audio conversion program 31 alone, a part of the functions implemented by the acquisition unit 311, the text conversion unit 312, the interpretation unit 313, the output unit 314 and the language specifying unit 315 can be implemented by using other programs, or the functions implemented by the functions implemented by the acquisition unit 311, the text conversion unit 312, the interpretation unit 313, the output unit 314 and the language specifying unit 315 can be implemented indirectly by executing other programs.

For example, a part or all of the functions of the interpretation unit 313 of the operation audio conversion program 31 can be implemented by the audio assistant program 32. In this case, the audio assistant program 32 determines whether or not a phrase (e.g., word) included in the text data matches the dictionary information. Further, if the phrase (e.g., word) included in the text data matches the dictionary information, the audio assistant program 32 converts the phrase (e.g., word) into a parameter indicating variables, such as an intent and a job condition corresponding to an intention of user. Then, the interpretation unit 313 acquires the intent and the parameter from the audio assistant program 32.

As illustrated in FIG. 7, the CPU 301 of the cloud service apparatus 30 executes the audio assistant program 32 stored in the storage 304 to implement a function, such as a providing unit 321.

The providing unit 321 controls or manages the dictionary information that pre-defines a relationship between text data, intent, and parameter, and provides the dictionary information to the operation audio conversion program 31. Further, the providing unit 321 may interpret an operation instruction input by a user based on the text data. Specifically, the providing unit 321 acquires the text data from the operation audio conversion program 31, determines whether or not a phrase (e.g., word) included in the text data matches the dictionary information, and if the phrase (e.g., word) included in the text data matches the dictionary information, the providing unit 321 converts the text data into an intent and a parameter. Then, the providing unit 321 provides the intent and the parameter to the operation audio conversion program 31.

In this example case, the providing unit 321 is implemented by the software, but a part or all of the providing unit 321 can be implemented by hardware such as integrated circuit (IC). The functions implemented by the providing unit 321 can be implemented by the audio assistant program 32 alone, a part of the functions implemented by the providing unit 321 can be implemented by using other programs, or the functions implemented by the providing unit 321 can be implemented indirectly by executing other programs.

The CPU 301 of the cloud service apparatus 30 executes the management program 33 stored in the storage 304 to implement functions, such as an interpretation result conversion unit 331, an execution instruction unit 332, an apparatus information acquisition unit 333, an execution determination unit 334, a notification unit 335, a management unit 336, and a search unit 337 as illustrated in FIG. 7.

The interpretation result conversion unit 331 converts an interpretation result, such as the intent and the parameter converted by the operation audio conversion program 31, into a job execution instruction interpretable by the MFP 10.

The execution instruction unit 332 transmits the job execution instruction to the MFP 10 to instruct an execution of the job. The execution instruction unit 332 transmits the job execution instruction to the MFP 10 associated with the smart speaker 20 specified or identified by the association DB 35. That is, the execution instruction unit 332 acquires the device ID identifying the smart speaker 20 used by a user along with the intent and the parameter. The execution instruction unit 332 retrieves or searches information indicating the MFP 10 associated with the acquired device ID from the association DB 35. Then, the execution instruction unit 332 transmits a job execution instruction to the retrieved MFP 10.

The apparatus information acquisition unit 333 acquires processing capability of the MFP 10, such as the maximum number of pixels, from the MFP 10. If the apparatus information acquisition unit 333 acquires the processing capability from a plurality of target apparatuses including the MFP 10, the apparatus information acquisition unit 333 stores the processing capability in the storage 304 with information, such as the apparatus ID identifying the target apparatus.

Further, the apparatus information acquisition unit 333 acquires the apparatus state. The apparatus state represents information including a connection state indicating whether a communication connection to the MFP 10 has been established or not, a power state indicating whether the MFP 10 is ON or OFF-state or a sleep mode, an error occurrence, a type of error, a residual state of consumable items such as a remaining state of sheet and toner, a user's login state, and access right information indicating one or more functions that are allowed to be used by a log-in user, or the like.

The execution determination unit 334 compares the processing capability of the MFP 10 and the job designated by a user (i.e., the intent and parameter generated by the operation audio conversion program 31) to determine whether or not the job designated by the user can be executed by the MFP 10. If the execution determination unit 334 determines that the job designated by the user can be executed by the MFP 10, the execution determination unit 334 transmits the job execution instruction to the MFP 10. On the other hand, if the execution determination unit 334 determines that the job is not executable by the MFP 10, the execution determination unit 334 feeds back an error message to the smart speaker 20 as response information using the operation audio conversion program 31.

The notification unit 335 transmits text data, audio data, image data, or the like to the operation audio conversion program 31 as a response to the user's job execution instruction. If the parameter indicating the job condition to be used for executing the job is insufficient, the notification unit 335 feeds back to the smart speaker 20 via the operation audio conversion program 31 to instruct the user to input the insufficient parameter. In this case, the notification unit 335 can transmit parameter information as information necessary for checking and confirming the insufficient parameter, or can transmit text data, audio data, or image data as information necessary for demanding or prompting the user to designate the insufficient parameter.

The management unit 336 associates and stores the device ID of the smart speaker 20 and the apparatus ID of the MFP 10 based on information and instruction input to a client device connected to the MFP 10, the smart speaker 20, or the cloud service apparatus 30. Further, the association DB 35 stores, for example, table data as information associating the device ID of the smart speaker 20 and the apparatus ID of the MFP 10.

The search unit 337 searches a designated file from the storage 304 and/or the management DB 34. Further, the search unit 337 can search a file or the like from another storage device, or can search a file or the like from a server connected via the network 50, instead of the storage 304.

In this example case, the interpretation result conversion unit 331, the execution instruction unit 332, the apparatus information acquisition unit 333, the execution determination unit 334, the notification unit 335, the management unit 336 and the search unit 337 are implemented by the software, but a part or all of the interpretation result conversion unit 331, the execution instruction unit 332, the apparatus information acquisition unit 333, the execution determination unit 334, the notification unit 335, the management unit 336 and the search unit 337 can be implemented by hardware such as integrated circuit (IC). Further, the functions implemented by the interpretation result conversion unit 331, the execution instruction unit 332, the apparatus information acquisition unit 333, the execution determination unit 334, the notification unit 335, the management unit 336 and the search unit 337 can be implemented by the management program 33 alone, a part of the functions implemented by the interpretation result conversion unit 331, the execution instruction unit 332, the apparatus information acquisition unit 333, the execution determination unit 334, the notification unit 335, the management unit 336 and the search unit 337 can be implemented by using other programs, or the functions implemented by the interpretation result conversion unit 331, the execution instruction unit 332, the apparatus information acquisition unit 333, the execution determination unit 334, the notification unit 335, the management unit 336 and the search unit 337 can be implemented indirectly by executing other programs.

Further, the operation audio conversion program 31, the operation audio conversion program 31, the audio assistant program 32 and the management program 33 may be recorded on a recording medium readable by a computer device such as a compact disk ROM (CD-ROM), a flexible disk (FD) or the like in a file of an installable format or an executable format. Further, the operation audio conversion program 31, the operation audio conversion program 31, the audio assistant program 32 and the management program 33 may be recorded on a recording medium readable by a computer device such as CD-R, digital versatile disk (DVD), Blu-ray Disc (registered trademark), semiconductor memory, or the like. Further, the operation audio conversion program 31, the operation audio conversion program 31, the audio assistant program 32 and the management program 33 may be installed from a network such as the Internet or the like, or may be provided in advance in a ROM or the like of the apparatus.

Figure 8:
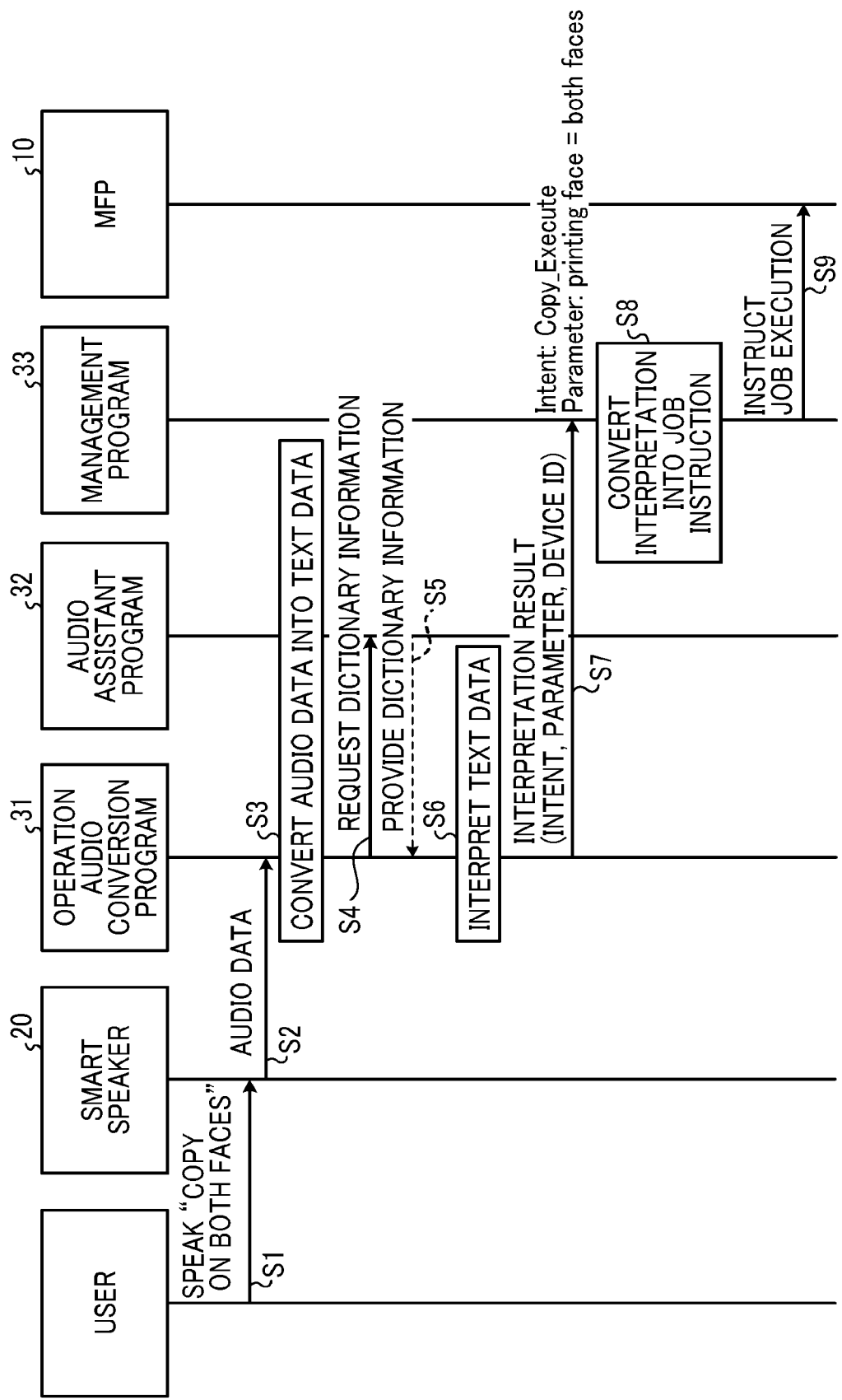
FIG. 8 is an example of a sequence diagram of operating an MFP based on an audio input operation via a smart speaker.

Operation of Audio-Based Operation System:

Hereinafter, a description is given of an audio-based operation (audio-use operation) in the audio-based operation system according to the embodiment with reference to FIG. 8. FIG. 8 is an example of a sequence diagram of operating the MFP 10 to perform a both-face copying function based on an audio input operation via the smart speaker 20.

In this case, a user activates the operation audio processing program 21 of the smart speaker 20. For example, the user speaks "copy on both faces" (step S1). At this stage, the operation audio conversion program 31 can be activated at the same time of activating the smart speaker 20, or can be activated by performing a given operation or given audio input to the smart speaker 20. The acquisition unit 211 of the smart speaker 20 acquires the audio (e.g., phrase, word) spoken by a user and collected by the microphone 209.

Then, the communication control unit 212 of the smart speaker 20 transmits the audio data of "copy on both faces" acquired by the acquisition unit 211 to the operation audio conversion program 31 of the cloud service apparatus 30 (step S2). At this stage, the communication control unit 212 transmits the device ID identifying the smart speaker 20 to the cloud service apparatus 30.

Then, the text conversion unit 312 of the operation audio conversion program 31 converts the audio data of "copying on both faces" into text data (step S3).

Then, the interpretation unit 313 of the operation audio conversion program 31 requests dictionary information to the audio assistant program 32 (step S4).

Then, the interpretation unit 313 receives the dictionary information provided from the audio assistant program 32 (step S5).

Then, the interpretation unit 313 of the operation audio conversion program 31 interprets the text data based on the dictionary information provided from the audio assistant program 32 (step S6).

In this example case, the interpretation unit 313 interprets an operation to be requested to and executed by the MFP 10 is "copy (intent: Copy_Execcute)" and interprets "printing face is both faces (printing face=both faces)." In this manner, the interpretation unit 313 generates an interpretation result indicating a type (intent) and content (parameter) of the job designated by the user based on the text data.

Then, the interpretation unit 313 transmits the interpretation result to the management program 33 (step S7). At this stage, the interpretation unit 313 transmits, to the cloud service apparatus 30, the device ID identifying the smart speaker 20, which is the transmission source of the audio data, in association with the interpretation result.

Then, the interpretation result conversion unit 331 of the management program 33 converts the interpretation result acquired from the operation audio conversion program 31 into a job instruction interpretable by the MFP 10 (step S8). Table 1 illustrates an example of the interpretation results and the job instructions converted from the interpretation results. Further, the interpretation result conversion unit 331 may store the information corresponding to Table 1 in the storage 304 of the cloud service apparatus 30 and refer to Table 1 to convert the interpretation result into the job instruction.

TABLE 1

| Name | Value | Processing by voice actions application |
|---|---|---|
| Action | COPY_EXECUTE | Execution of copy job |
|  | SCAN_EXECUTE | Execution of scan job |
|  | PRINT_EXECUTE | Execution of print job |
|  | FAX_EXECUTE | Execution of fax job |
| Parameter | printing face | Change setting value of printing face |
|  | number of copies | Change setting value of number of copies |
|  | *parameter may include any value designatable as job setting value | |

In an example of Table 1, "COPY_EXECUTE," "SCAN_EXECUTE," "PRINT_EXECUTE," and "FAX_EXECUTE" are set as examples of Intent. Further, "printing face" and "number of copies" are indicated as examples of Parameter. The parameter includes any parameter that can be designated as the job setting value.

The interpretation result conversion unit 331 of the smart speaker 20 converts an interpretation result of "COPY_EXECUTE" into a job instruction of the MFP 10, such as "Execution of copy job." Similarly, the interpretation result conversion unit 331 converts an interpretation result of "SCAN_EXECUTE" into a job instruction of the MFP 10 such as "Execution of scan job." Similarly, the interpretation result conversion unit 331 converts an interpretation result of "PRINT_EXECUTE" into a job instruction of the MFP 10 such as "Execution of print job." Similarly, the interpretation result conversion unit 331 converts an interpretation result of "FAX_EXECUTE" into a job instruction of the MFP 10 such as "Execution of fax job."

The basic jobs executed by the MFP 10 are indicated as above, but the jobs interpretable by the cloud service apparatus 30 are not limited to the jobs described above. For example, a job that causes a communication target apparatus (control target apparatus, target apparatus) to collect and transmit apparatus information to the cloud service apparatus 30, or a job that causes the communication target apparatus to display given information stored in the storage 114 of the communication target apparatus on the display 103 of the communication target apparatus can be instructed and executed.

Further, if the interpretation result includes the parameter of "printing face," the interpretation result conversion unit 331 of the smart speaker 20 generates a job instruction of the MFP 10, such as "change setting value of printing face." Similarly, if the interpretation result includes the parameter of "number of copies," the interpretation result conversion unit 331 generates a job instruction of the MFP 10, such as "change setting value of number of copies."

That is, the interpretation result conversion unit 331 of the smart speaker 20 determines the user intension, such as a type of job to be executed by the MFP 10, based on the information included in "Intent" of the interpretation result. Further, the interpretation result conversion unit 331 determines a value included in "Parameter" as the job setting value, and converts the interpretation result into the job instruction or job execution instruction.

Then, the notification unit 335 of the management program 33 transmits the generated job instruction to the MFP 10 (step S9). In this example case, the notification unit 335 transmits the job instruction of "copy job execution (printing face=both faces)" to the MFP 10. The notification unit 335 transmits the job instruction to the MFP 10 specified or identified by the management unit 336. In other words, the management program 33 can instruct an execution of job to the MFP 10 identified by the apparatus ID associated with the device ID identifying the smart speaker 20, which is the transmission source of the audio data. Then, the MFP 10 performs duplex printing.

Interpretation in Cloud Service Apparatus:

The storage 304 of the cloud service apparatus 30 stores the dictionary information used for interpreting the job instructed by the audio input performed by the user. The operation audio conversion program 31 generates the intent and parameter based on the dictionary information. More specifically, the operation audio conversion program 31 determines whether or not a phrase (e.g., word) included in the text data converted from the audio data matches the dictionary information. If the phrase (e.g., word) included in the text data converted from the audio data matches the dictionary information, the operation audio conversion program 31 generates the interpretation result including the intent and parameter defined in the dictionary information. The dictionary information can be defined using any format if the intent and the parameter can be generated.

As one example, the dictionary information includes entity information (Entity), intent information (Intent), and association information.

The entity information represents information that associates a parameter of job with natural language. As to the entity information, a plurality of parameter synonyms can be registered for one parameter.

The intent information represents information indicating the job type.

The association information represents information that associates the user-spoken phrases (natural language) and entity information, and information that associates the user-spoken phrases (natural language) and intent information, respectively. The association information allows the correct interpretation even if the spoken order or nuance of parameter becomes slightly different. Further, the response text (interpretation result) can be generated based on the input content information and the association information.

FIG. 9 is an example of the entity information. FIG. 9 is an example of the entity information corresponding to print color (printColor). In FIG. 9, characters of "printColor" indicates one entity name. Further, in FIG. 9, characters such as "auto_color," "monochrome," "color" or the like in the left column indicate specific parameter names. Further, in FIG. 9, characters such as "auto_color," "monochrome, black and white," "color, full color" or the like in the right column indicate specific synonyms.

As indicated in FIG. 9, the parameters and synonyms can be associated with each other as the entity information. For example, by registering the parameters and synonyms in association with each other, if a copying of monochrome is to be instructed, the parameter can be set even if a user speaks "Please copy by black and white" or "Please copy by monochrome."

FIGS. 10A to 10C are an example of entity information registered based on a spoken phrase in an audio-based operation system according to the embodiment. FIG. 10A illustrates examples of spoken phrases of user. FIG. 10B illustrates an intent name. FIG. 10C illustrates the entity information. As illustrated in FIGS. 10A to 10C, by operating the operation unit 308 on a screen displayed on the display 307 provided for the cloud service apparatus 30, the user-spoken content can be dragged. Alternatively, if another apparatus is connected to the cloud service apparatus 30 via the network 50, by operating an operation unit of another apparatus that have accessed the cloud service apparatus 30 via the network, the user-spoken content can be dragged.

With this configuration, the entity information, which is a target of association, can be selected. Further, when a value ("VALUE" in FIG. 10C) is set for the selected entity information, the parameter, which is entered as the response, is changed. For example, if the user speaks "Please copy by black and white," and the value is "SprintColor," a return value of "printColor=monochrome" is returned. In contrast, if the value is "SprintColor.original," then a return value of "printColor=black and white" is returned. In this case, if the value is "SprintColor.original," the user-spoken content itself can be returned as the parameter of the response.

Interactive Operation:

Hereinafter, a description is given of an interactive operation implemented in the audio-based operation system 1 of the embodiment, in which the system performs an the interactive operation based on content input by a user, such as audio (e.g., voice) input by the user. As to the audio-based operation system 1, in addition to responding to standard phrases required for the interactive operation, the interactive operation using the MFP can be implemented by performing two types of responses, such as "input insufficient feedback" and "input confirmation feedback," set as specific responses used for the operation of the MFP 10.

The "input insufficient feedback" is a response that is output when the information required to execute a job is insufficient. If the information content input by the user cannot be recognized by the system, or if the required parameter is determined to be insufficient, the "input insufficient feedback" is output. That is, for the parameter other than the required parameter (hereinafter, non-relevant parameter), it is not necessary to provide insufficient feedback even if the non-relevant parameter is not instructed. Further, in addition to the parameter, a process of checking to-be-used function, such as copying function and scanning function, can be also included in the "input insufficient feedback."

For example, depending on the type of an target apparatus being connected for communicating with the cloud service apparatus 30, the function and the parameter to be checked by the user can be changed. In this case, the apparatus information acquisition unit 333 acquires information indicating the type and function of the target apparatus at a pre-set timing after the communication with the target apparatus is established, and the function and the parameter to be checked by the user can be determined, for example, by the audio feedback unit 213 based on the acquired information.

For example, if the type of target apparatus is MFP 10, the functions included in MFP 10 such as copying, printing, scanning, facsimile can be confirmed by the user. Further, the user can check which function of the MFP 10 is to be used among functions included in MFP 10 such as copying, printing, scanning, and facsimile, included in the MFP 10. Further, the required parameter can be changed according to the setting conditions designated by the user. In other words, if the printing condition designated by the user is a variable magnification printing, the printing sheet size is set as the required parameter. Further, if the printing condition designated by the user is a both-face printing, the settings indicating whether the document is single-sided or double-sided is set as the required parameter. Further, if the printing condition designated by the user is a weekly magazine binding printing, the settings indicating the finished size and the number of pages to be included in one page are set as the required parameter.

The "input confirmation feedback" is a response that is output when the information required to execute the job is sufficiently or completely prepared. That is, the "input confirmation feedback" is output only when all of the required parameters are instructed. Further, the input confirmation feedback is performed to demand or prompt the user to select whether to execute the job using the current setting values or to change the current setting values. In order to confirm whether or not to execute the job using the current setting values, all of the parameters (any required parameter and any non-required parameter) instructed by the user can be output as an audio sound so that the parameters can be confirmed by the user.

Figure 11:
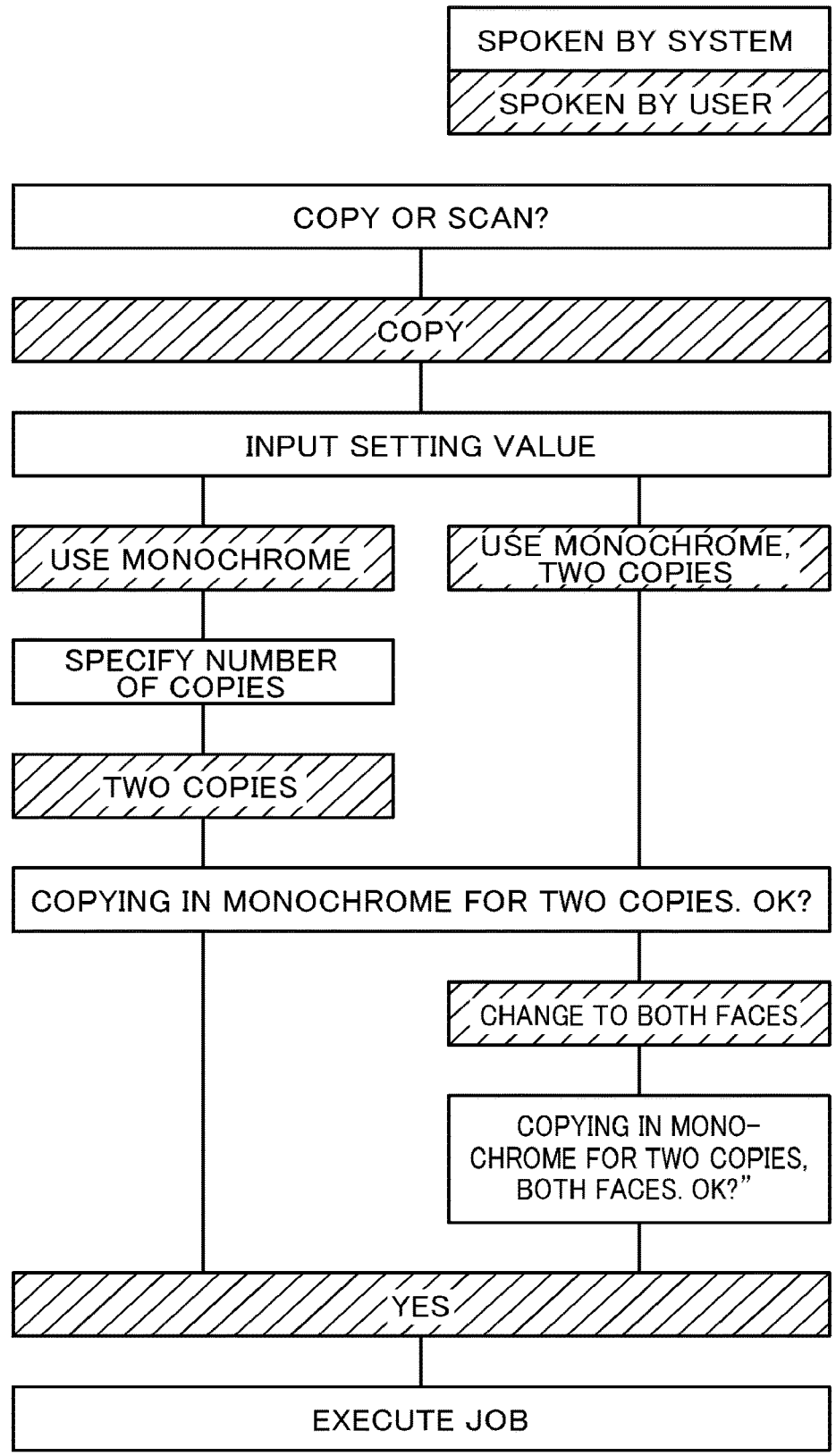
FIG. 11 is a diagram illustrating a flow of an interactive audio-based operation in the audio-based operation system according to the embodiment.

FIG. 11 is a diagram illustrating a flow of an interactive audio-based operation in the audio-based operation system 1. FIG. 11 is an example of an operation of the MFP 10 to perform copying of two copies of a monochrome image on both faces of a recording medium, such as sheet. In this example case, the number of copies (=two copies) becomes the required parameter. The required parameter is not limited to the number of copies, but may include a plurality of parameters, such as monochrome, color, and sheet size.

Further, one or more required parameters and one or more non-required parameters can be determined from a plurality of parameters and can be stored in advance in the storage 304 of the cloud service apparatus 30. For example, the execution determination unit 334 of the management program 33 determines whether or not the required parameter is satisfied or sufficient based on the intent and parameter acquired from the operation audio conversion program 31. Further, by operating the operation unit 308 by a user or by accessing the cloud service apparatus 30 via the network 50, which parameter is the required parameter can be changed appropriately.

In an example case illustrated in FIG. 11, sections indicated by a diagonal line is spoken by a user (audio output by the user) and sections without the diagonal line is spoken by the audio-based operation system 1 (audio output by the system). At first, when the audio-based operation system 1 outputs an audio of "copy or scan?," the user speaks "copy" to instruct to use the copy function. Then, the audio-based operation system 1 outputs an audio of "input setting value" to request the user to enter or input one or more setting values to be for "copy" designated by the user.

Then, it is assumed that the user speaks "use monochrome." In this example case, as described above, the number of copies is the required parameter. Therefore, the audio-based operation system 1 requests the number of copies, such as "specify number of copies." This is an example of "input insufficient feedback." As to the "input insufficient feedback," the user specifies or designates the number of copies, such as "two copies." With this operation, the insufficient input state is solved, so that the audio-based operation system 1 responds with an audio of "copying in monochrome for two copies. OK?" and demands or prompts the user to start the copying. This is the "input confirmation feedback" that is output when the information necessary to execute the job is sufficient or complete.

As to the audio-based operation system 1, if the user responds by speaking audio of "use monochrome, two copies" to the audio output of "input setting value," the information necessary for executing the job becomes sufficient. Then, the audio-based operation system 1 outputs the above described "input confirmation feedback" such as "copying in monochrome for two copies. OK?"

Then, if a copy mode is changed from the one-face (one-sided) copying to the duplex (two-face) copying, the user speaks an audio of "change to both faces." In this case, since the information necessary to execute the job becomes sufficient, the audio-based operation system 1 outputs "the input confirmation feedback" such as "copying in monochrome for two copies, both faces. OK?"

Then, if the user responds "YES" to the "input confirmation feedback such as "copying in monochrome for two copies. OK?" or "copying in monochrome for two copies, both faces. OK?," the audio-based operation system 1 responds with an audio of "Execute job," and executes the job designated by the user.

Figure 12:
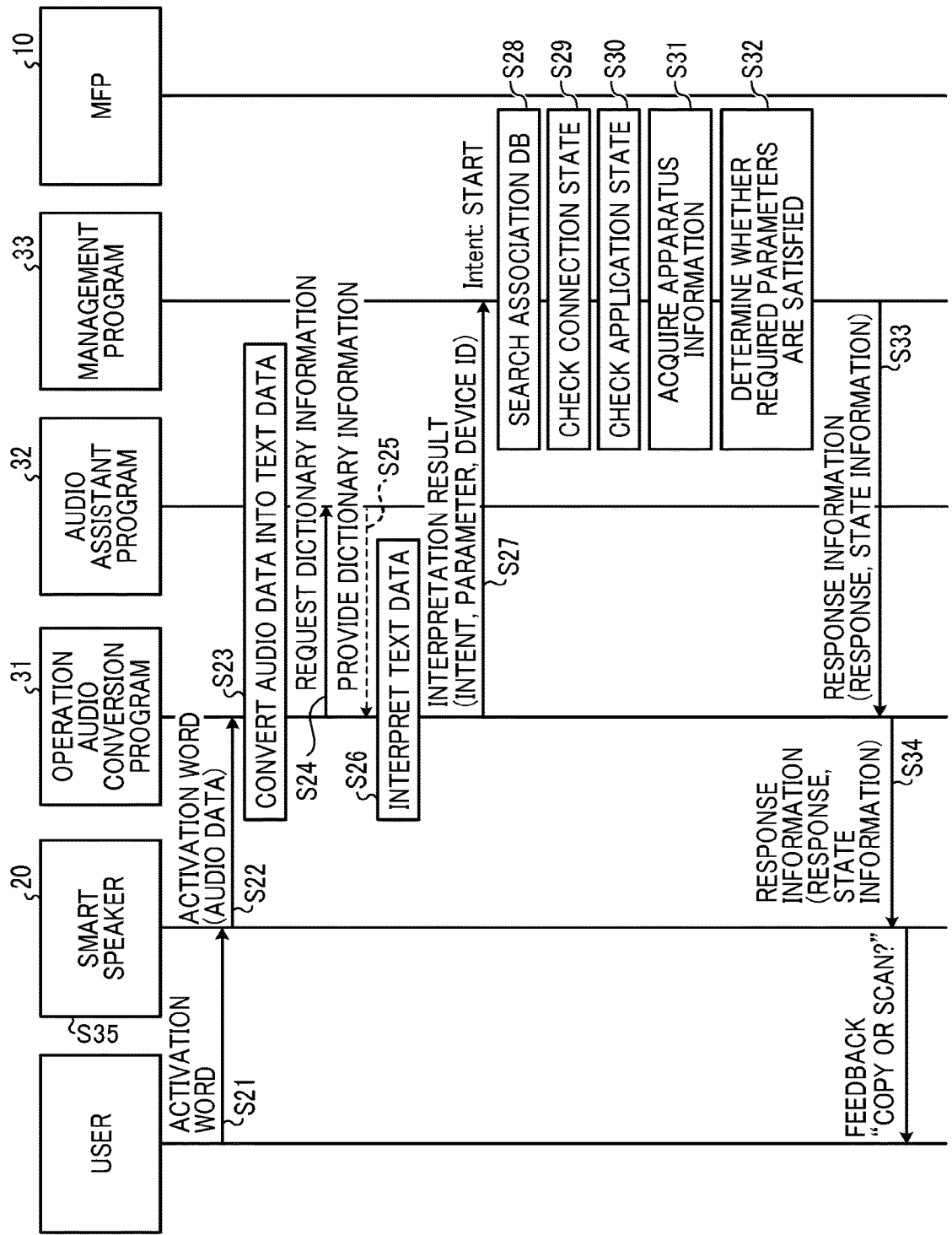
FIG. 12 is an example of a sequence diagram of a flow of an activation operation executed by the audio-based operation system according to the embodiment.

Flow of Interactive Operation:

FIG. 12 is an example of a sequence diagram of a flow of an activation operation executed by the audio-based operation system 1 according to the embodiment.

After a user activates the operation audio processing program 21 of the smart speaker 20, the user instructs an activation of the audio assistant program 32 by speaking something, which is an audio input by the user (step S21). For example, the user speaks an activation phrase (e.g., activation word, term) for activating the audio assistant program 32.

Then, the communication control unit 212 of the smart speaker 20 transmits the activation phrase (i.e., audio data) to the cloud service apparatus 30 (step S22).

Then, the text conversion unit 312 of the operation audio conversion program 31 converts the activation phrase (i.e., audio data) into text data (step S23).

Then, the interpretation unit 313 of the operation audio conversion program 31 interprets the text data based on the dictionary information provided by the audio assistant program 32 (steps S24, S25, S26).

Then, the interpretation unit 313 transmits an interpretation result to the management program 33 (step S27). That is, the interpretation unit 313 transmits the intent, parameter, and device ID to the management program 33. Then, steps S28 to S32 may be performed before transmitting the response information in step S33.

In response to receiving the interpretation result (step S27), the execution determination unit 334 of the management program 33 searches the association DB 35 to search or retrieve the MFP 10 associated with the acquired device ID from the association DB 35 (step S28). At this stage, if the MFP 10 associated with the device ID is not stored in the association DB 35, the notification unit 335 notifies the user that the smart speaker 20 is not associated with the communication target apparatus, such as the MFP 10. For example, the execution determination unit 334 generates response information including a response that "this device is not associated with the communication target apparatus." Further, the execution determination unit 334 can include a method of associating the device and the communication target apparatus in the response. The searching of MFP 10 from the association DB 35 and the generation of response information may be performed at any other timing when the device ID is acquired.

Further, the apparatus information acquisition unit 333 checks a connection state indicating whether or not a communication connection with the MFP 10 has been established (step S29).

Further, the execution determination unit 334 checks the state of application to be used for executing the function designated by the user to the communication target apparatus (step S30). Specifically, the execution determination unit 334 refers to the apparatus information acquired currently by the apparatus information acquisition unit 333 or the apparatus information acquired by the apparatus information acquisition unit 333 in advance to determine whether the application is installed or not, and whether the application is executable.

For example, when the function to be executed is copy and if the application related to the copy is not installed on the MFP 10 associated with the device ID, or if the application cannot be used due to the activation of application, the execution determination unit 334 notifies response information to the user. For example, the execution determination unit 334 generates the response information including a response of "application is not installed" or "application is not currently executable." The execution determination unit 334 can include a countermeasure method in the response. Further, the application state can be checked or confirmed at any other timing when the intent, parameter, and device ID is acquired from the operation audio conversion program 31.

Further, the execution determination unit 334 acquires apparatus information acquired currently by the apparatus information acquisition unit 333, or by reading out the apparatus information acquired by apparatus information acquisition unit 333 in advance (step S31). For example, the acquired apparatus information is used to determine whether or not the job type and job condition designated by the user can be executed at the communication target apparatus.

Then, the execution determination unit 334 determines whether all of the conditions required for the job execution are set or satisfied based on the intent and the parameter (step S32). For example, the execution determination unit 334 determines whether or not the required parameter is satisfied or sufficient in step S32.

If the required parameter is not satisfied or sufficient in step S32, the execution determination unit 334 transmits response information to the operation audio conversion program 31 (step S33).

Then, the operation audio conversion program 31 transmits the response information to the smart speaker 20 (step S34).

The response information can include text data, audio data, and image data. In this example case, the text data of "copy or scan?" is transmitted. The content is not limited to this message as long as the message demands or prompts the user to enter or input the job type and/or the job setting condition. Further, if the smart speaker 20 cannot convert the text data into the audio data, the response information can be transmitted as the audio data.

Then, the audio feedback unit 213 of the smart speaker 20 outputs (speaks), for example, an audio feedback of "copy or scan?" (step S35). The smart speaker 20 can also display a text or image on the touch panel 207 as the feedback to the user, in addition to the audio output. Further, if the job type and/or the job setting condition are designated when the audio assistant program 32 is activated, the above described steps can be omitted.

Figure 13A:
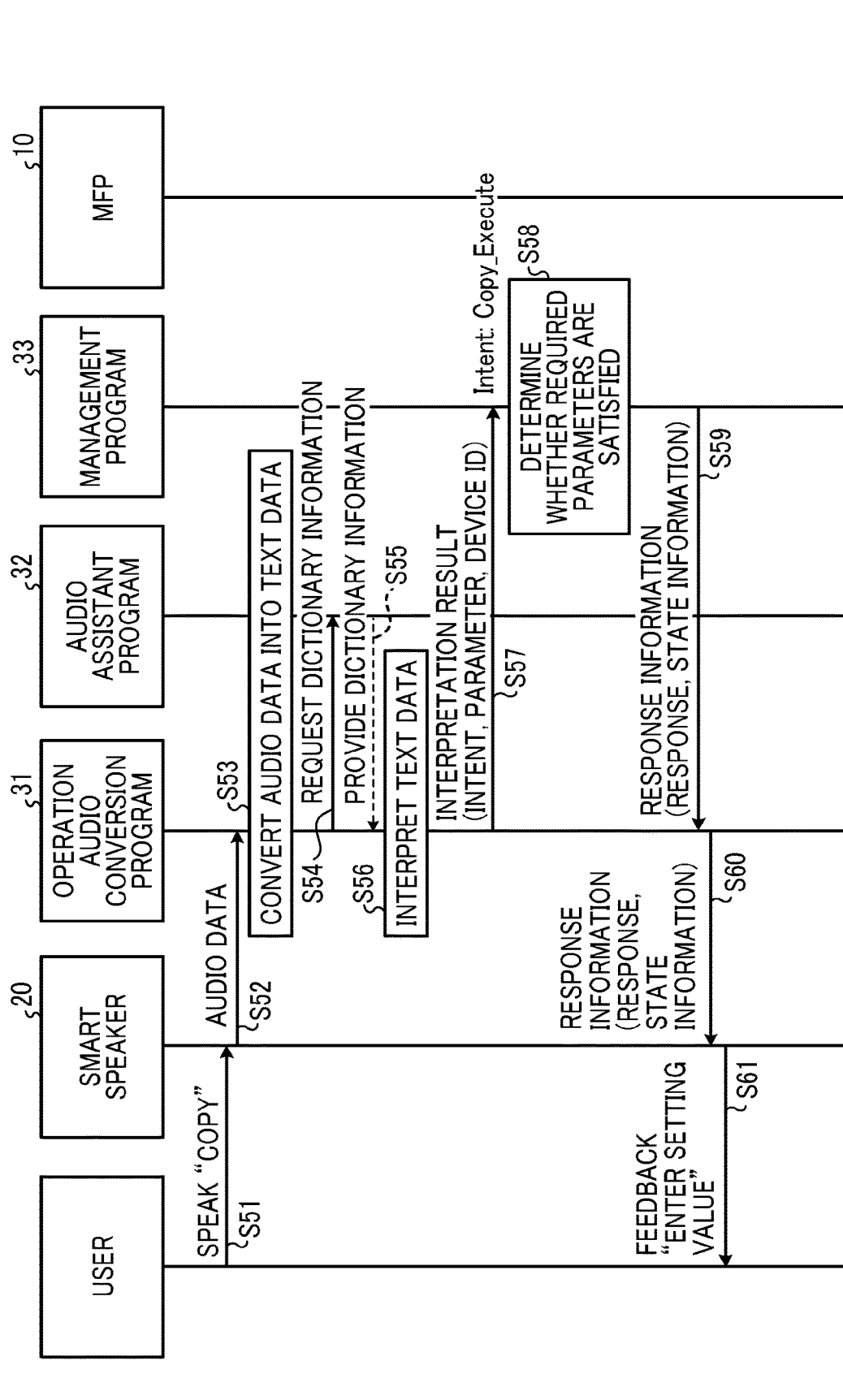

FIGS. 13A and 13B (FIG. 13) are an example of a sequence diagram of a flow of a copy setting process by audio-based operation executed by the audio-based operation system 1 according to the embodiment.

At first, a user speaks "copy" (step S51). Alternatively, the user speaks "copy" when instructing an activation of the audio assistant program 32.

Then, the communication control unit 212 of the smart speaker 20 transmits audio data of "copy" to the cloud service apparatus 30 (step S52).

Then, the text conversion unit 312 of the operation audio conversion program 31 converts the audio data into text data (step S53).

Then, the interpretation unit 313 of the operation audio conversion program 31 interprets the text data based on the dictionary information provided by the audio assistant program 32 (steps S54, S55, S56).

A described with reference to FIGS. 9 and 10A to 10C, the interpretation unit 313 interprets the intent and parameter based on the user-spoken phrase indicated by the text data. In this example case, the intent of "Copy_Execute" is generated as an interpretation result and transmitted to the management program 33. In this example case, since the user only speaks "copy," the number of copies or the like is unknown (insufficient input).

Then, the interpretation unit 313 transmits the interpretation result to the management program 33 (step S57).

Then, the execution determination unit 334 of the management program 33 determines that the required parameter is not satisfied or sufficient based on the interpretation result (step S58). Based on this determination, the cloud service apparatus 30 inquires the insufficient parameter to the smart speaker 20.

Then, the notification unit 335 of the management program 33 transmits response information (Response) of "input setting value" to the smart speaker 20 via the operation audio conversion program 31 (steps S59, S60).

A this stage, the notification unit 335 of the management program 33 transmits the state information indicating that the session is being continued when transmitting the response information to the operation audio conversion program 31. The state information indicate the status of session. For example, if the job execution instruction has not yet been transmitted to the target apparatus and the job setting process by the user is being continued, the notification unit 335 transmits the state information indicating that the session is being continued to the operation audio conversion program 31. On the other hand, if the transmission of job execution instruction to the target apparatus is completed, the notification unit 335 transmits the state information indicating that the session has been completed to the operation audio conversion program 31.

However, the state information is not limited thereto, but may include the state information indicating the status of session in more detail.

The interpretation unit 313 of the operation audio conversion program 31 can determine whether or not the session is to be continued or ended based on the state information. In other words, if the session is being continued, the operation audio conversion program 31 determines that the job belongs to one job even if the user designates the job setting condition by speaking a plurality of user-spoken phrases separately. Further, if the session has ended, the operation audio conversion program 31 determines that the job setting condition included in the user-spoken phrase belongs to a new job.

With this configuration, even if the instruction of the job type and the job setting condition indicate the plurality of user-spoken phrases, the operation audio conversion program 31 can determine whether or not the instruction using the plurality of user-spoken phrases belongs to the same job or belongs to another new job. Further, if a state that the signal not being received from the smart speaker 20 continues for a pre-set period of time or longer, the operation audio conversion program 31 may determine the end of the session. Even if the cloud service apparatus 30 controls or manages the session, the MFP 10, which is the communication target apparatus, may execute the job regardless of the state of the session.

In this example case, when the MFP 10 acquires the job execution instruction, the MFP 10 overwrites the job condition included in the job execution instruction onto the job condition retained in the MFP 10. At this stage, the MFP 10 can delete all of job conditions stored in the MFP 10 or return all of job conditions stored in the MFP 10 to the default condition to set the job conditions included in the job execution instruction. Further, if the job conditions included in the job execution instruction are not consistent with the job conditions stored in the MFP 10, the MFP 10 may overwrite the job conditions included in the job execution instruction onto the job conditions stored in the MFP 10. If the job conditions included in the job execution instruction are consistent with the job conditions stored in the MFP 10, the MFP 10 retains the job conditions stored in the MFP 10 (communication target apparatus). Further, after the job is executed, the MFP 10 can delete the job conditions included in the job execution instruction to set the default condition registered for the MFP 10 in advance.

Then, the audio feedback unit 213 of the smart speaker 20 outputs an audio of "input setting value" via the speaker 208 and displays a text of "input setting value" on the touch panel 207 (step S61). Further, any one of the audio output and text display on the touch panel 207 may be omitted.

Then, since the input insufficient feedback is output via the smart speaker 20, the user speaks, for example, "both faces" (step S62).

Then, the communication control unit 212 of the smart speaker 20 transmits the audio data of "both faces" to the cloud service apparatus 30 (step S63).

Then, the text conversion unit 312 of the operation audio conversion program 31 converts the audio data of "both faces" into text data (step S64).

Then, the interpretation unit 313 of the operation audio conversion program 31 interprets the text data based on the dictionary information provided by the audio assistant program 32 (steps S65, S66, S67). In this example case, a parameter of "printing face=both faces" is generated as an interpretation result.

Then, the interpretation unit 313 transmits the interpretation result including the intent of "Copy_Execute" and the parameter of "printing face=both faces" to the management program 33, with the intent and parameter included in the previously spoken phrase (step S68).

Then, the execution determination unit 334 determines whether the parameter acquired from the smart speaker 20 satisfies the required parameter sufficiently (step S69). In this example case, since the user speaks only "copy" and "both faces," the number of copies is unknown (insufficient required parameter).

In the above, the operation audio conversion program 31 combines the interpretation result of the previously spoken phrase and the interpretation result of the currently spoken phrase to generate the intent and the parameter, but is not limited thereto. That is, the management program 33 may store the interpretation result of the previously spoken phrase, and then integrate the interpretation result of the previously spoken phrase and the interpretation result of the currently spoken phrase to generate the intent and the parameter. In this case, the interpretation unit 313 transmits only the parameter of "printing face=both faces" that is newly acquired from the currently spoken phrase to the management program 33.

The storage 304 of the cloud service apparatus 30 can store, in advance, which parameter is the required parameter among a plurality of the parameters. In this case, the execution determination unit 334 determines whether the parameter acquired from the smart speaker 20 satisfies the required parameter sufficiently based on information of the required parameter stored in the storage 304. If the required parameter is not set sufficiently, the execution determination unit 334 demands or prompts the user to set the required parameter sufficiently via the smart speaker 20.

Therefore, the notification unit 335 of the management program 33 transmits response information (Response) of "How many copies are printed?" to the smart speaker 20 via the operation audio conversion program 31 (steps S70, S71).

Then, the audio feedback unit 213 of the smart speaker 20 outputs an audio of "How many copies are printed" via the speaker 208, and displays text of "How many copies are printed?" on the touch panel 207 (step S72).

Figure 14A:
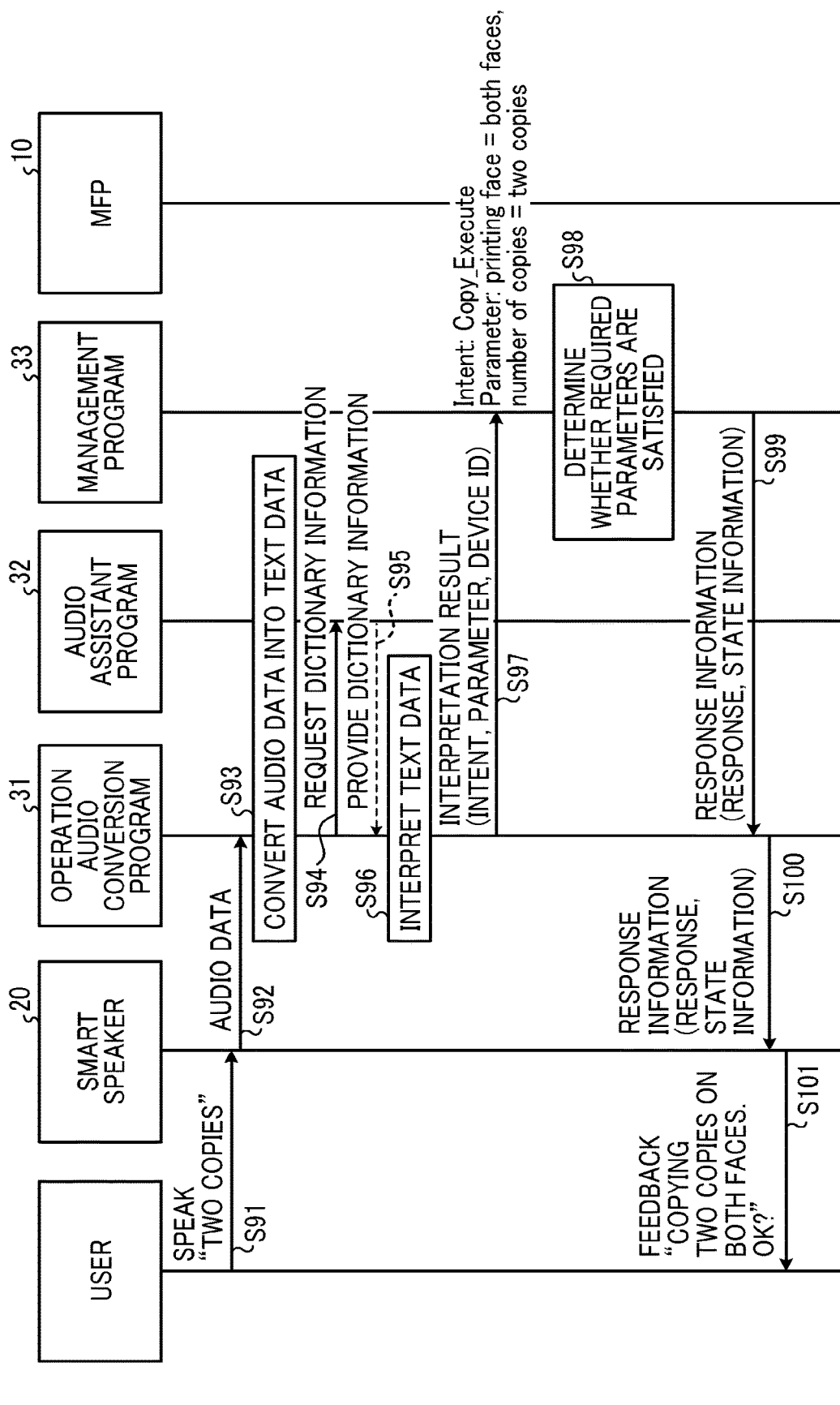
FIGS. 14A and 14B (FIG. 14) are an example of a sequence diagram of a flow of a number setting process by audio-based operation executed by the audio-based operation system according to the embodiment.
Figure 14B:
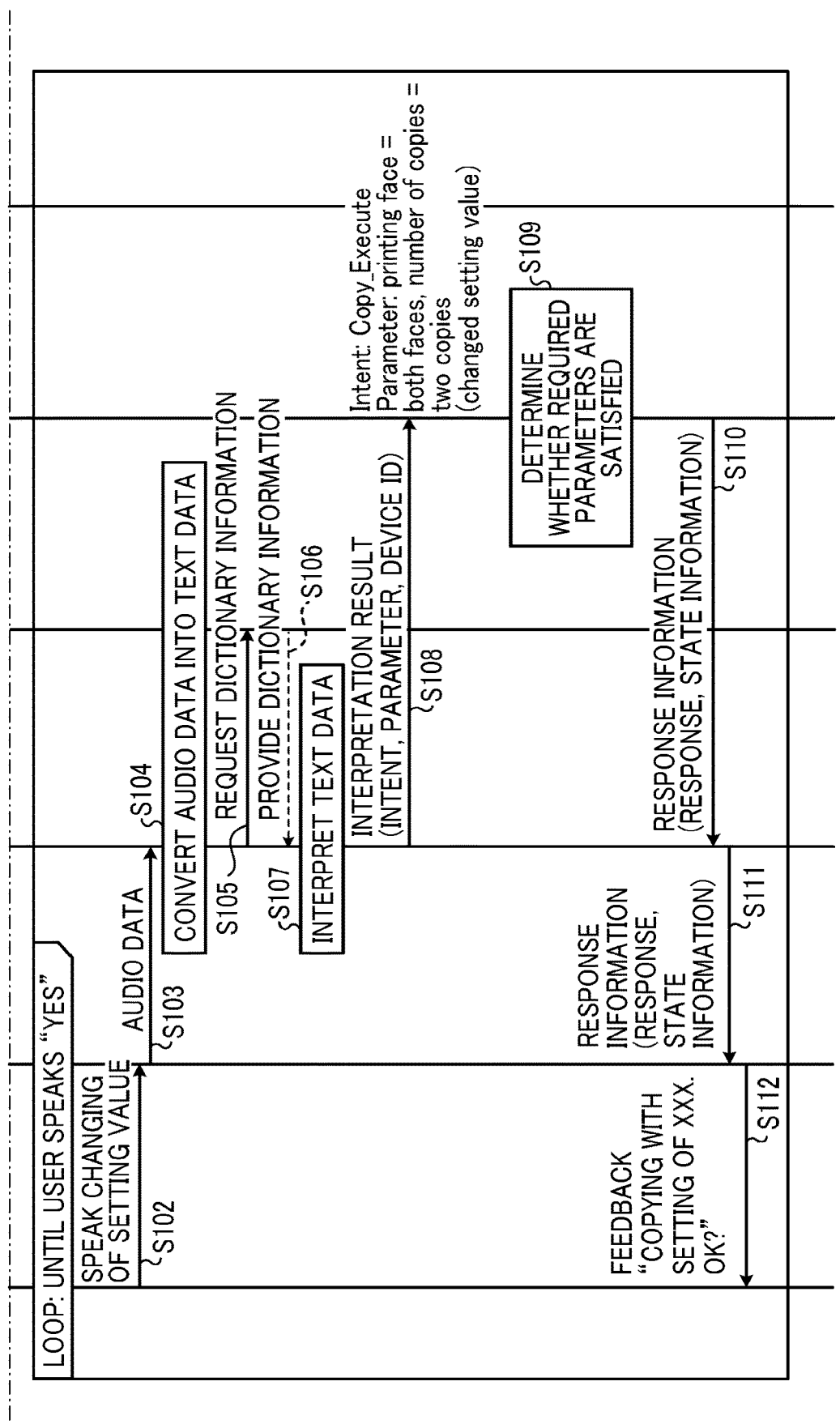

FIGS. 14A and 14B (FIG. 14) are an example of a sequence diagram of a flow of a number setting process by audio-based operation executed by the audio-based operation system 1 according to the embodiment.

Then, since the input insufficient feedback is output again via the smart speaker 20, the user speaks, for example, "two copies" (step S91).

Then, the communication control unit 212 of the smart speaker 20 transmits audio data of "two copies" to the cloud service apparatus 30 (step S92).

Then, the text conversion unit 312 of the operation audio conversion program 31 converts the audio data of "two copies" into text data (step S93).

Then, the interpretation unit 313 of the operation audio conversion program 31 interprets the text data based on the dictionary information provided by the audio assistant program 32 (steps S94, S95, S96).

In this case, the interpretation unit 313 generates a parameter of "number of copies=two" as an interpretation result.

Then, the interpretation unit 313 transmits the interpretation result including the intent of "Copy_Execute" and the parameter of "printing face=both faces, number of copies=two copies" to the management program 33, with the intent and the parameter included in the previously spoken phrase (step S97).

Then, the execution determination unit 334 determines whether the parameter acquired from the smart speaker 20 satisfies the required parameter sufficiently (step S98). In this case, the user uses the smart speaker 20 to transmit the audio data of "two copies" to solve the insufficient required parameter for the copy job.

Therefore, the notification unit 335 of the management program 33 transmits response information of "copying two copies on both faces. OK?" to the smart speaker 20 via the operation audio conversion program 31 (steps S99, S100).

Then, since the state of the insufficient required parameter has been solved and is ready to start the copying, the audio feedback unit 213 of the smart speaker 20 outputs an audio based on the response included in the response information (step S101). For example, the audio feedback unit 213 outputs an audio of "copying two copies on both faces. OK?" corresponding to the text of the input confirmation feedback of "copying two copies on both faces. OK?."

In this case, the smart speaker 20 can read out a part or all of the text data stored in the storage 204 of the smart speaker 20, and combine a part or all of the read-out text data to generate information to be output instead of outputting the text data and the audio data included in the response information. In response receiving the input confirmation feedback, the user performs an audio input to instruct a change of the setting value or a start of copying.

In this example case, the sequence of steps S102 to S112 indicates the flow of operation in a case when the change of setting value is instructed using the audio.

Then, the user speaks changing of the setting value (step S102).

Then, the communication control unit 212 of the smart speaker 20 transmits the audio data to the cloud service apparatus 30 (step S103).

Then, the text conversion unit 312 of the operation audio conversion program 31 converts the audio data indicating the changing of setting value into text data (step S104).

Then, the interpretation unit 313 of the operation audio conversion program 31 interprets the text data based on the dictionary information provided by the audio assistant program 32 (steps S105, S106, S107).

Then, the interpretation unit 313 transmits an interpretation result to the management program 33 (step S108).

Then, the execution determination unit 334 determines whether the parameter acquired from the smart speaker 20 satisfies the required parameter sufficiently (step S109).

Then, the notification unit 335 of the management program 33 transmits response information in accordance with a determination result to the smart speaker 20 via the operation audio conversion program 31 (steps S110, S111).

Then, based on the response included in the response information, the audio feedback unit 213 of the smart speaker 20 outputs, for example, an audio feedback of "copying with setting of xxx. OK?" (step S112).

Figure 15:
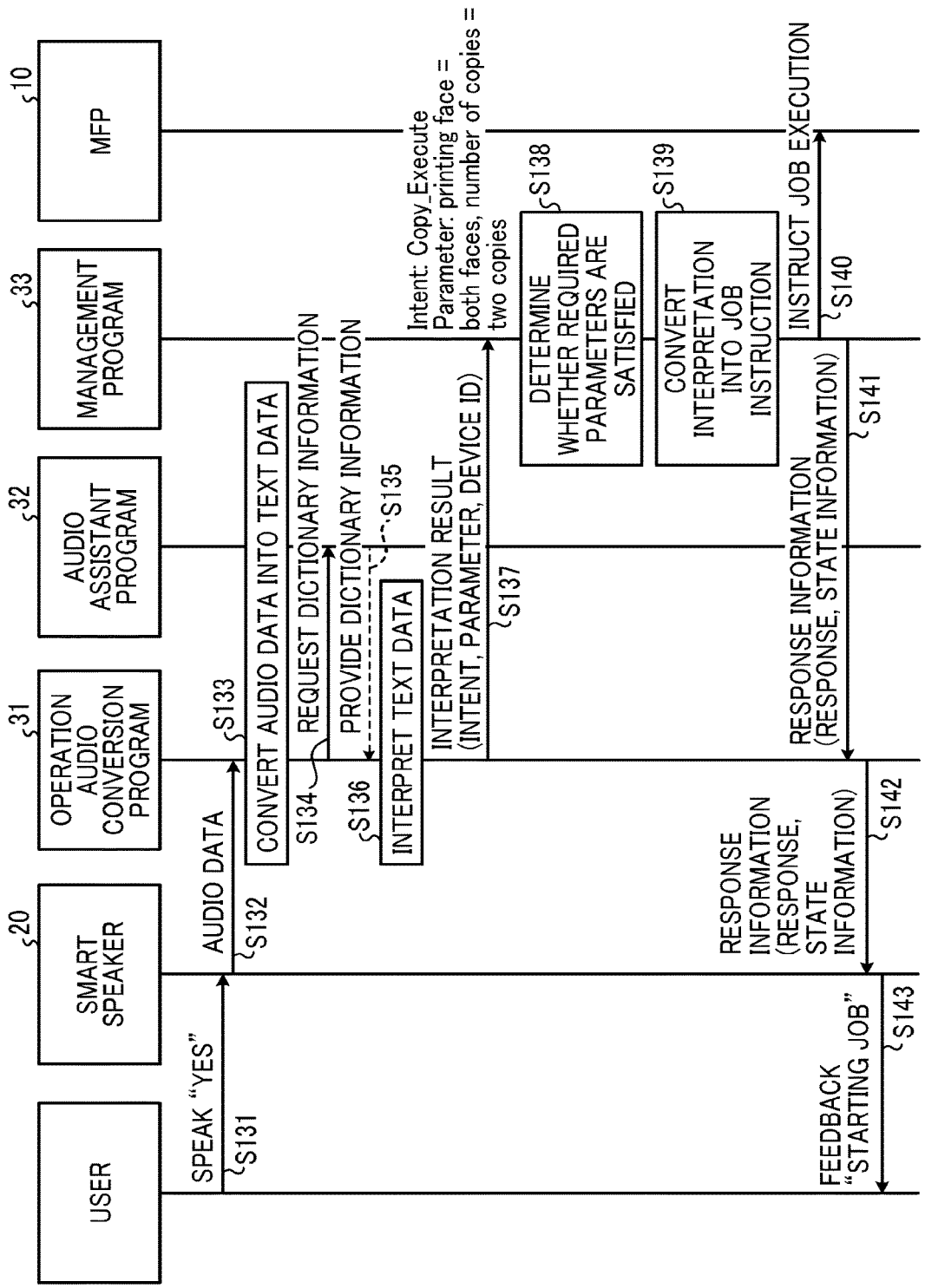
FIG. 15 is an example of a sequence diagram of a flow of confirmation processing by audio-based operation executed by the audio-based operation system according to the embodiment.

Steps S131 to S143 in the sequence diagram of FIG. 15 indicate a flow of the operation of respective units when the start of copying is instructed.

In response to receiving the above described input confirmation feedback (step S112), the user speaks "YES" (step S131).

Then, the communication control unit 212 of the smart speaker 20 transmits the audio data of "YES" to the cloud service apparatus 30 (step S132).

Then, the text conversion unit 312 of the operation audio conversion program 31 converts the audio data into text data (step S133).

Then, the interpretation unit 313 of the operation audio conversion program 31 interprets the text data based on the dictionary information provided by the audio assistant program 32 (step S134, S135, S136). In this case, when the interpretation unit 313 recognizes a copy start instruction based on the text data, the interpretation unit 313 generates an interpretation result by adding the parameter of "printing face=both faces" and "number of copies=two" to the intent of "Copy_Execute."

Then, the interpretation unit 313 transmits the interpretation result to the management program 33 (step S137). However, if the execution determination unit 334 of the management program 33 determines that the interpretation result satisfies the required parameter sufficiently, the input confirmation feedback may be omitted.

Then, the execution determination unit 334 of the management program 33 determines whether or not the interpretation result satisfies the required parameter sufficiently (step S138).

If the execution determination unit 334 determines that the interpretation result satisfies the required parameter sufficiently in step S138, the interpretation result conversion unit 331 converts the interpretation result into a job instruction of the MFP 10 (step S139).

Then, the execution instruction unit 332 transmits the job instruction to the MFP 10 (step S140). In this way, the MFP 10 performs the copying using the audio-based operation.

Then, the notification unit 335 of the management program 33 transmits the response information indicating that execution of the job is started by the job instruction to the smart speaker 20 via the operation audio conversion program 31 (steps S141, S142).

Then, the audio feedback unit 213 of the smart speaker 20 outputs, for example, an audio feedback of "starting job" based on the Response included in the response information (step S143).

Figure 16:
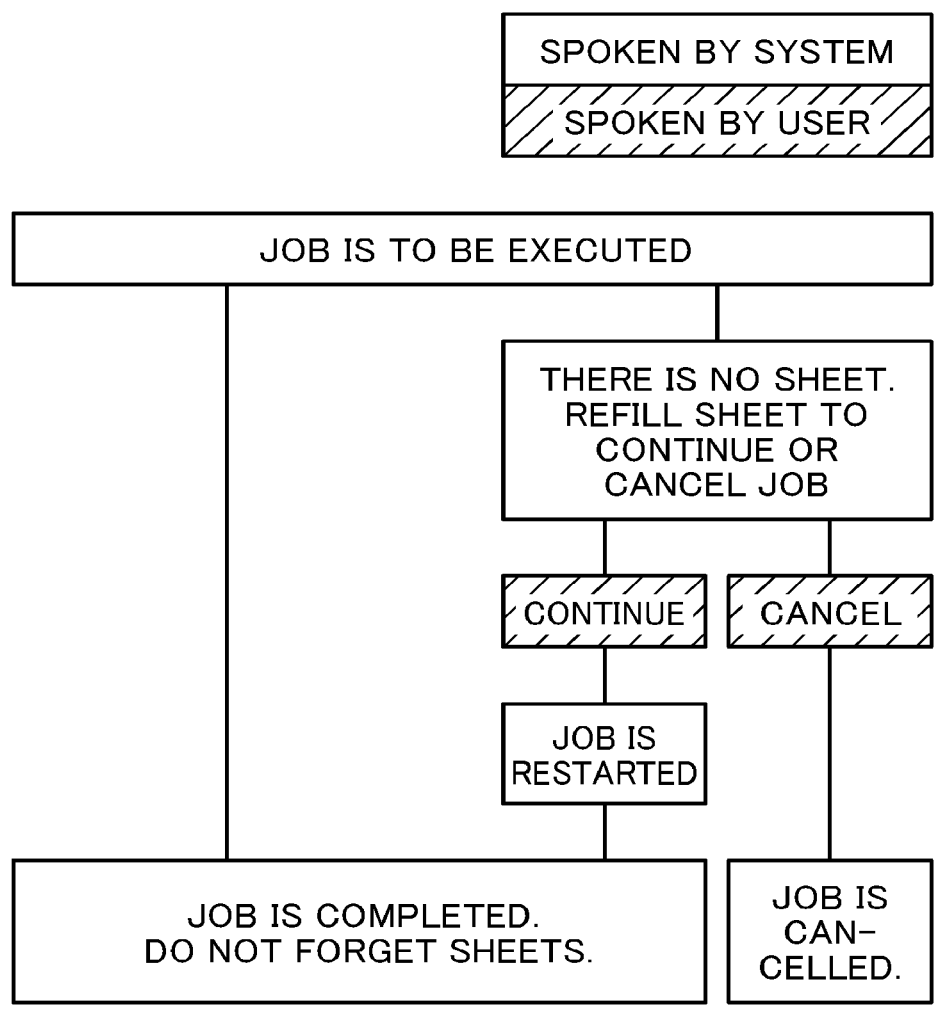
FIG. 16 is an example of a flow of an interactive audio-based operation when an error occurs.

Information Feedback from Cloud Service Apparatus:

Hereinafter, a description is given of an example of interactive operation when a job is executed and an error occurs with reference to FIG. 16. FIG. 16 is an example of a flow of an interactive audio-based operation when an error occurs. In the above, the audio feedback unit 213 of the smart speaker 20 outputs the text data and the audio data included in the response information. However, the audio feedback unit 213 can output information differently. For example, the audio feedback unit 213 can read out a part or all of the text data stored in the storage 204 of the smart speaker 20 based on information included in the response information, and combine a part or all of the read-out text data to generate information that the audio feedback unit 213 is to output. The following Table 2 illustrates an example of feedback information and response information fed back to the smart speaker 20 from the cloud service apparatus 30.

TABLE 2

| Name | Value | Processing by voice actions application |
|---|---|---|
| Action | COPY_PARAMETER_SETTING | Prompting to input job setting value |
|  | COPY_CONFIRM | Prompting to confirm job setting value |
|  | COPY_EXECUTE | Execution of copy job |
| Parameter | printing face | Change setting value of printing face |
|  | number of copies | Change setting value of number of copies |
|  | *parameter may include any value designatable as job setting value |  |
| Response | Text | Feedback contents specified by text to user |

Specifically, as indicated in Table 2, for example, the Intent of "COPY_PARAMETER_SETTING" for demanding or prompting the input of job setting value and the Intent of "COPY_CONFIRM" for demanding or prompting the confirmation of the job setting value can be included in the response information, and then the response information is fed back to the smart speaker 20 from the cloud service apparatus 30.

The audio feedback unit 213 of the smart speaker 20 determines a feedback to a user in accordance with the intent, parameter, and response included in the response information. To determine the content of feedback, the audio feedback unit 213 can be configured to store the information corresponding to Table 2 in the storage 204 of the smart speaker 20 and refer to Table 2. Table 2 describes a case of copying, but "printing, scanning, and facsimile" can be set as the Action of Table 2, and "Parameter_Setting" for demanding or prompting the user to input the job setting value and "Confirm" for demanding or prompting the user to confirm the job setting value can be set. Further, the response information includes the intent, and at least one of the parameter and response.

Further, the cloud service apparatus 30 feeds back the response information including the parameter to the smart speaker 20. The parameter is, for example, the setting value of printing face indicating both faces or one face, and the number of copies. Further, if the required parameter is determined to be insufficient, the cloud service apparatus 30 feeds back the response information including a message demanding or prompting the input of the insufficient parameter as a signal of the response, to the smart speaker 20.

Execution of Job and Dialogue when Error Occurs:

Hereinafter, a description is given of an operation when a job is executed, for example, when a user speaks "YES" to the above described input confirmation feedback of "execute job. OK?," or when an error occurs in the MFP 10 when a job is executed with reference to FIG. 16.

At first, when the user speaks "YES" to the input confirmation feedback of "execute job. OK?," the job is executed by the MFP 10. If the job is completed without any problem, for example, a completion message (audio and text), such as "job is completed" is output via the smart speaker 20.

On the other hand, if an error occurs, for example, due to a lack of sheet, a job confirmation feedback, such as "There is no sheet. Refill sheet to continue or cancel job" is output via the smart speaker 20. If the user refills sheets in the MFP 10 and speaks "Continue" as a response after receiving the job confirmation feedback, the job continuation is instructed to the MFP 10 to continue the job, and the job is restarted in the MFP 10.

On the other hand, if the user speaks "Cancel" as a response after receiving the job confirmation feedback, the job cancel is instructed to the MFP 10 to cancel the job, and the execution of the job in the MFP 10 after the error occurrence is canceled. Then, the job confirmation feedback, such as "Job is cancelled" is output via the smart speaker 20 using audio data and text data.

Figure 17A:
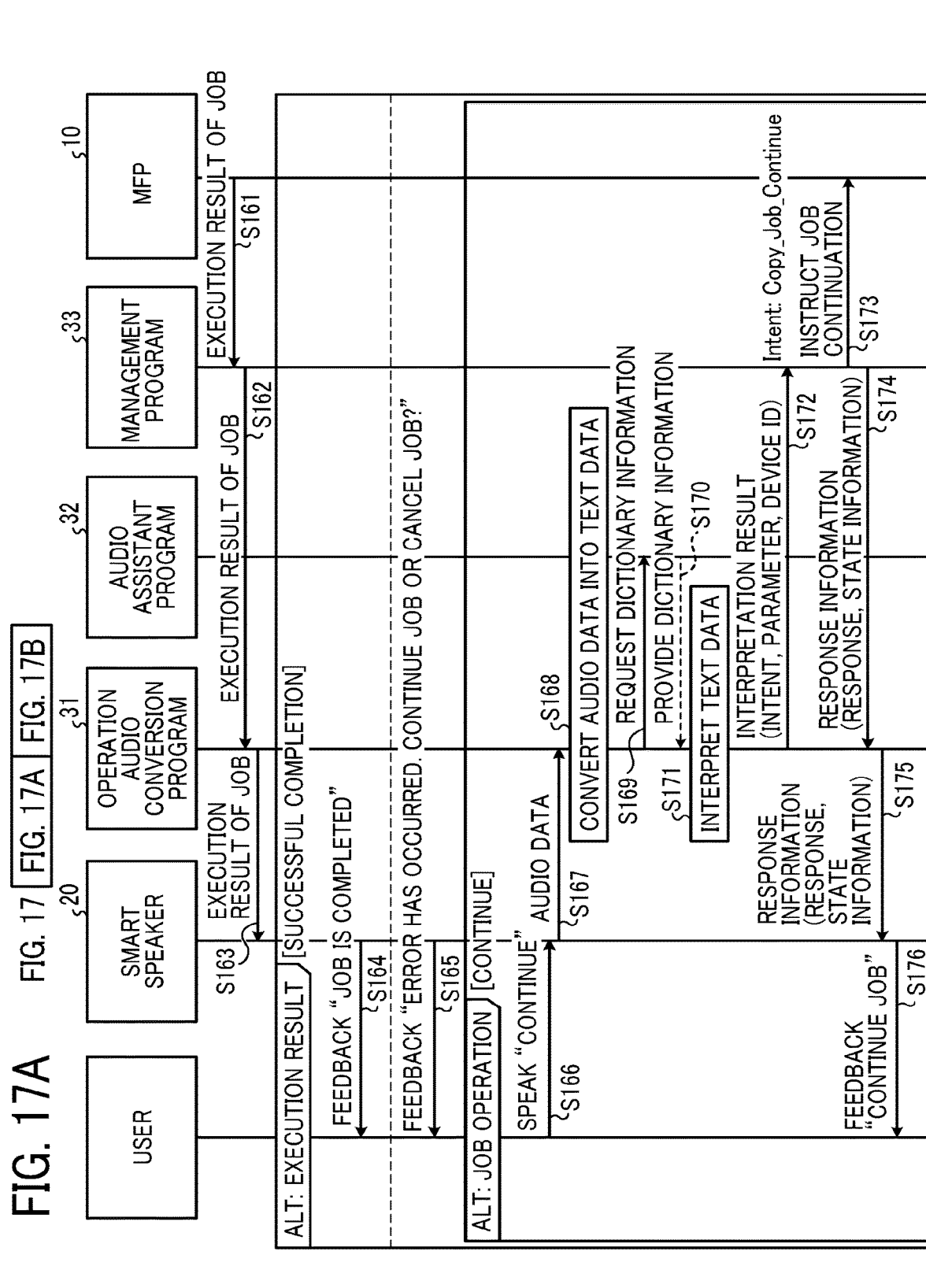
FIGS. 17A and 17B (FIG. 17) are an example of a sequence diagram of a flow of confirmation processing by audio-based operation executed by the audio-based operation system according to the embodiment.
Figure 17B:
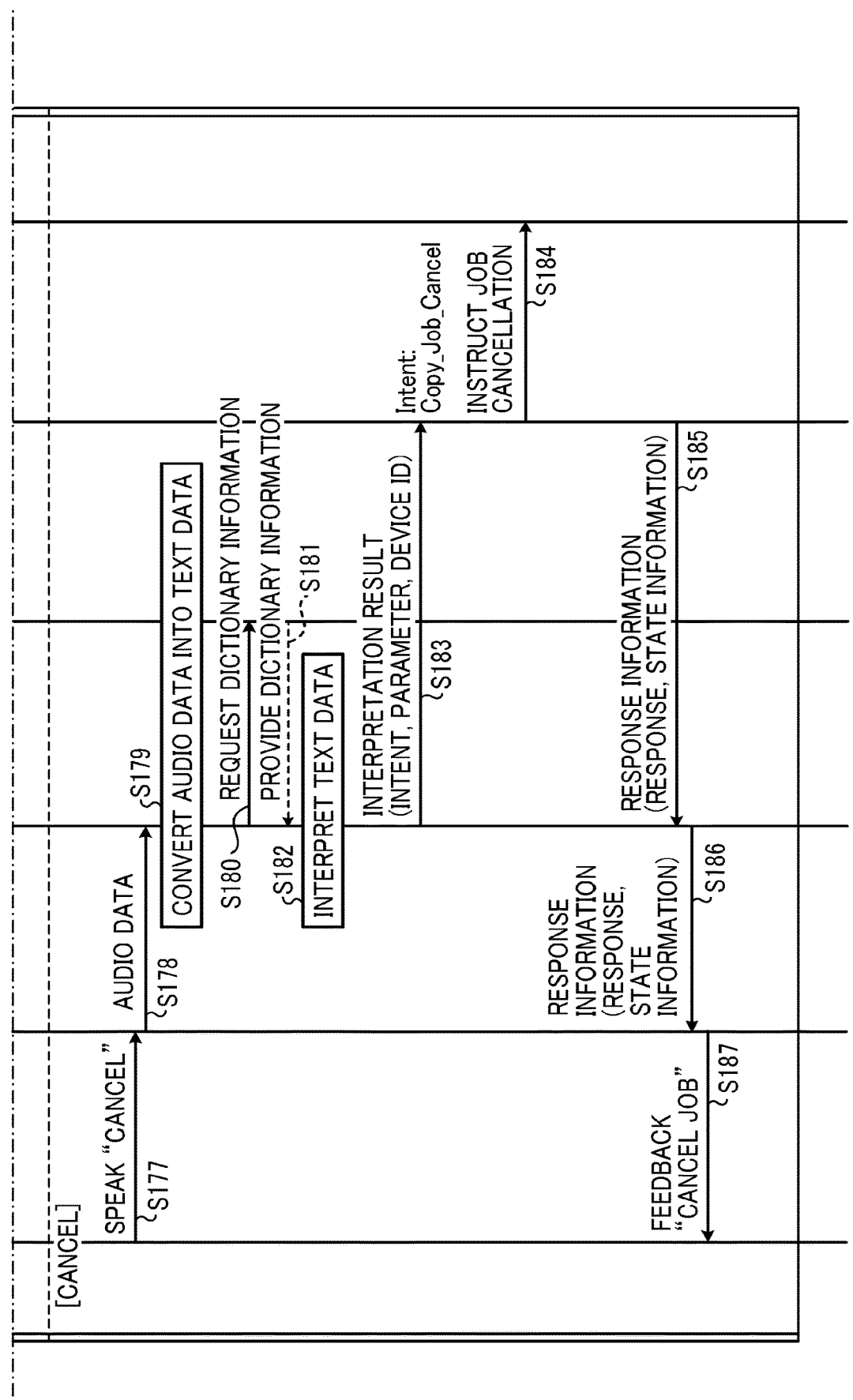

Flow of Job Execution and Dialogue of when Error Occurs:

FIGS. 17A and 17B (FIG. 17) are an example of a sequence diagram of a flow of confirmation processing by audio-based operation executed by the audio-based operation system 1 according to the embodiment.

After executing the instructed job, the MFP 10 transmits an execution result indicating that the job has been completed successfully or an execution result indicating that an error has occurred to the management program 33 of the cloud service apparatus 30 (step S161).

Then, the management program 33 transmits the execution result to the operation audio conversion program 31 (step S162).

Then, the operation audio conversion program 31 transmits the execution result to the smart speaker 20 (step S163).

If the smart speaker 20 receives the execution result of successful completion of the job in step S163, the audio feedback unit 213 of the smart speaker 20 outputs an audio message, such as "job is completed" (step S164).

On the other hand, if the smart speaker 20 receives the execution result that the error has occurred in step S163, the audio feedback unit 213 of the smart speaker 20 outputs an audio message of "error has occurred. continue job or cancel job?" inquiring whether the job is to be continued or not (step S165).

Specifically, the MFP 10 transmits a completion notification to the management program 33 when the job is completed successfully. Further, if an error occurs, the MFP 10 transmits error information, such as error content, to the management program 33.

Further, in response to receiving and acquiring the information from the MFP 10, the management program 33 generates response information including a message, such as "job is completed" or "error has occurred. continue job or cancel job?" Then, the management program 33 transmits the generated response information to the smart speaker 20 via the operation audio conversion program 31.

Steps S161 to S176 in FIG. 17 are the flow of operation of the respective units when the user designates continuation of the job.

That is, when the smart speaker 20 outputs the audio message inquiring "error has occurred continue job or cancel job?," the user removes the cause of error and speaks "Continue" to the inquiring (step S166).

Then, the communication control unit 212 of the smart speaker 20 transmits audio data of "continue" to the cloud service apparatus 30 (step S167).

Then, the text conversion unit 312 of the operation audio conversion program 31 converts the audio data into text data (step S168).

Then, the interpretation unit 313 of the operation audio conversion program 31 interprets the intent and parameter indicated in a user-spoken phrase, which is indicated by text data, based on the dictionary information provided by the audio assistant program 32 (steps S169, S70, S171).

Then, the interpretation unit 313 of the operation audio conversion program 31 generates an interpretation result setting the intent of "Copy_Job_Continue" and transmits the interpretation result to the management program 33 (step S172).

Then, the execution instruction unit 332 of the management program 33 instructs the MFP 10 to continue the job (step S173).

Then, the notification unit 335 of the management program 33 transmits response information setting the response of "continue job" to the smart speaker 20 via the operation audio conversion program 31 (steps S174, S175).

Then, the audio feedback unit 213 of the smart speaker 20 outputs the input confirmation feedback of "continue job" (step S176).

On the other hand, steps S177 to S187 in FIG. 17 indicate a flow of operation of respective units when the user designates cancellation of the job.

The smart speaker 20 outputs an audio message of inquiring "error has occurred. continue job or cancel job?," and the user speaks "cancel" to the inquiring (step S177).

Then, the communication control unit 212 of the smart speaker 20 transmits audio data of "cancel" to the cloud service apparatus 30 (step S178).

Then, the text conversion unit 312 of the operation audio conversion program 31 converts the audio data of "cancel" into text data (step S179).

Then, the interpretation unit 313 of the operation audio conversion program 31 interprets the text data based on the dictionary information provided by the audio assistant program 32 (steps S180, S181, S182).

Then, the operation audio conversion program 31 transmits an interpretation result setting the intent of "Copy_Job_Cancel" to the management program 33 (step S183).

Then, the execution instruction unit 332 of the management program 33 instructs the MFP 10 to cancel the job (step S184).

Then, the notification unit 335 of the management program 33 transmits response information setting the response of "cancel job" to the smart speaker 20 via the operation audio conversion program 31 (steps S185, S186).

Then, the audio feedback unit 213 of the smart speaker 20 outputs the input confirmation feedback of "cancel job" (step S187).

Figure 18B:
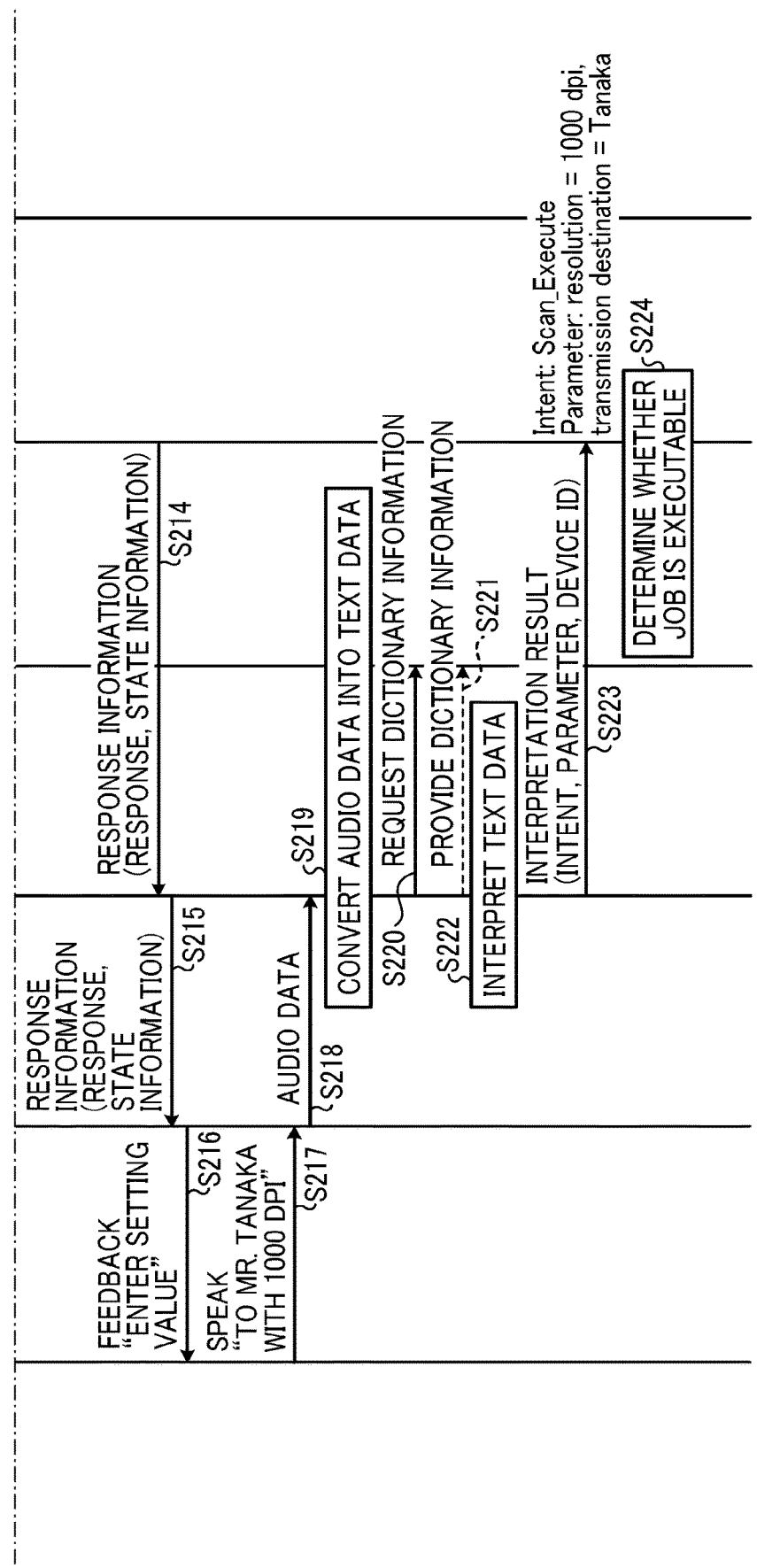

Adjustment of Parameter based on Apparatus Capability of MFP using Interactive Operation:

As to the audio-based operation system 1, the job execution corresponding to apparatus capability of the MFP 10 is implemented by performing an interactive operation. FIGS. 18A and 18B (FIG. 18) are an example of a sequence diagram illustrating a flow of determining whether the MFP 10 has the apparatus capability required for a to-be-executed job.

The apparatus information acquisition unit 333 of the management program 33 inquires the MFP 10, for example, a resolution that can be processed at the MFP 10 (step S201). That is, the apparatus information acquisition unit 333 acquires information of capabilities of the MFP 10, such as processing capability of the MFP 10.

In response to receiving the inquiry (step S201), the MFP 10 responds the processable resolution, such as "resolution: 200 dpi to 600 dpi" to the management program 33 (step S202), in which "dpi" means dot per inch.

Then, the notification unit 335 of the management program 33 transmits the processable resolution of the MFP 10 to the smart speaker 20 via the operation audio conversion program 31 (steps S203, S204). As a result, the smart speaker 20 recognizes the resolution processable at the MFP 10.

Further, the apparatus information acquisition unit 333 can be configured to acquire information of the processing capability (processing capability information) of the MFP 10 at a pre-set timing after the communication between the cloud service apparatus 30 and the MFP 10 has been established. For example, the apparatus information acquisition unit 333 can acquire the processing capability information of the MFP 10 when the MFP 10 is registered in the management DB 34, can acquire the processing capability information of the MFP 10 periodically, can acquire the processing capability information of the MFP 10 at the timing when receiving the activation of the audio assistant program 32 from the smart speaker 20, or can acquire the processing capability information of the MFP 10 at the timing when receiving a job instruction from the smart speaker 20. The acquired processing capability information of the MFP 10 can be stored in the storage 304 provided in the cloud service apparatus 30. For example, the acquired processing capability information of the MFP 10 can be stored in the management DB 34 in association with the MFP 10. Further, the acquisition of processing capability information of the MFP 10 can be executed by other program, and the apparatus information acquisition unit 333 can acquire the processing capability information set for the MFP 10 indirectly from the other program that has acquired the processing capability information of the MFP 10.

Further, the processing capability information acquired from the MFP 10 by the apparatus information acquisition unit 333 is not limited to the resolution information. For example, the apparatus information acquisition unit 333 can acquire information related to the job type that can be executed by the MFP 10 and the job setting condition, such as type and version of applications installed on the MFP 10, printing speed, processable file format, connection state of optional devices including a finisher.

After activating the operation audio conversion program 21 of the smart speaker 20, the user instructs an activation of the audio assistant program 32 by speaking something, which is an audio input by the user (step S205). In this way, the processing similar to steps S21 to S35 in FIG. 12 is performed.

Then, the audio feedback unit 213 of the smart speaker 20 outputs, for example, an audio feedback of "copy or scan?" for demanding or prompting the user to input or enter a job instruction (step S206). Then, the user speaks "scan" (step S207).

Then, the communication control unit 212 of the smart speaker 20 transmits audio data of "scan" to the cloud service apparatus 30 (step S208).

Then, the text conversion unit 312 of the operation audio conversion program 31 converts the audio data into text data (step S209).

Then, the interpretation unit 313 of the operation audio conversion program 31 interprets the text data based on the dictionary information provided by the audio assistant program 32 (steps S210, S211, S212).

Then, the interpretation unit 313 then transmits an interpretation result setting the intent of "Scan_Execute" to the management program 33 (step 213).

Since the scan instruction alone lacks the required parameter, the notification unit 335 of the management program 33 transmits response information setting a response of "input setting value" to the smart speaker 20 via the operation audio conversion program 31 (steps S214, S215).

Then, the audio feedback unit 213 of the smart speaker 20 outputs an input insufficient feedback of "input setting value" (step S216).

Then, in response to receiving the input insufficient feedback of "input setting value," the user speaks "To Mr. Tanaka with 1000 dpi" (step S217).

Then, the communication control unit 212 of the smart speaker 20 transmits audio data of "To Mr. Tanaka with 1000 dpi" to the cloud service apparatus 30 (step S218).

Then, the text conversion unit 312 of the operation audio conversion program 31 converts the audio data into text data (step S219).

Then, the interpretation unit 313 of the operation audio conversion program 31 interprets the text data based on the dictionary information provided by the audio assistant program 32 (steps S220, S221, S222).

Then, the interpretation unit 313 transmits an interpretation result setting the intent of "Scan_Execute" and the parameter of "resolution=1000 dpi, transmission destination=Tanaka" to the management program 33 (step S223).

Based on the parameter included in the interpretation result, the execution determination unit 334 of the management program 33 determines whether or not a job designated by the user is executable by the MFP 10 (step S224). Specifically, the execution determination unit 334 refers to the apparatus information acquired currently by the apparatus information acquisition unit 333 or the apparatus information acquired by the apparatus information acquisition unit 333 in advance to determine whether the job designated by the user can be executed or not at the communication target apparatus (e.g., MFP 10).

Figure 19B:
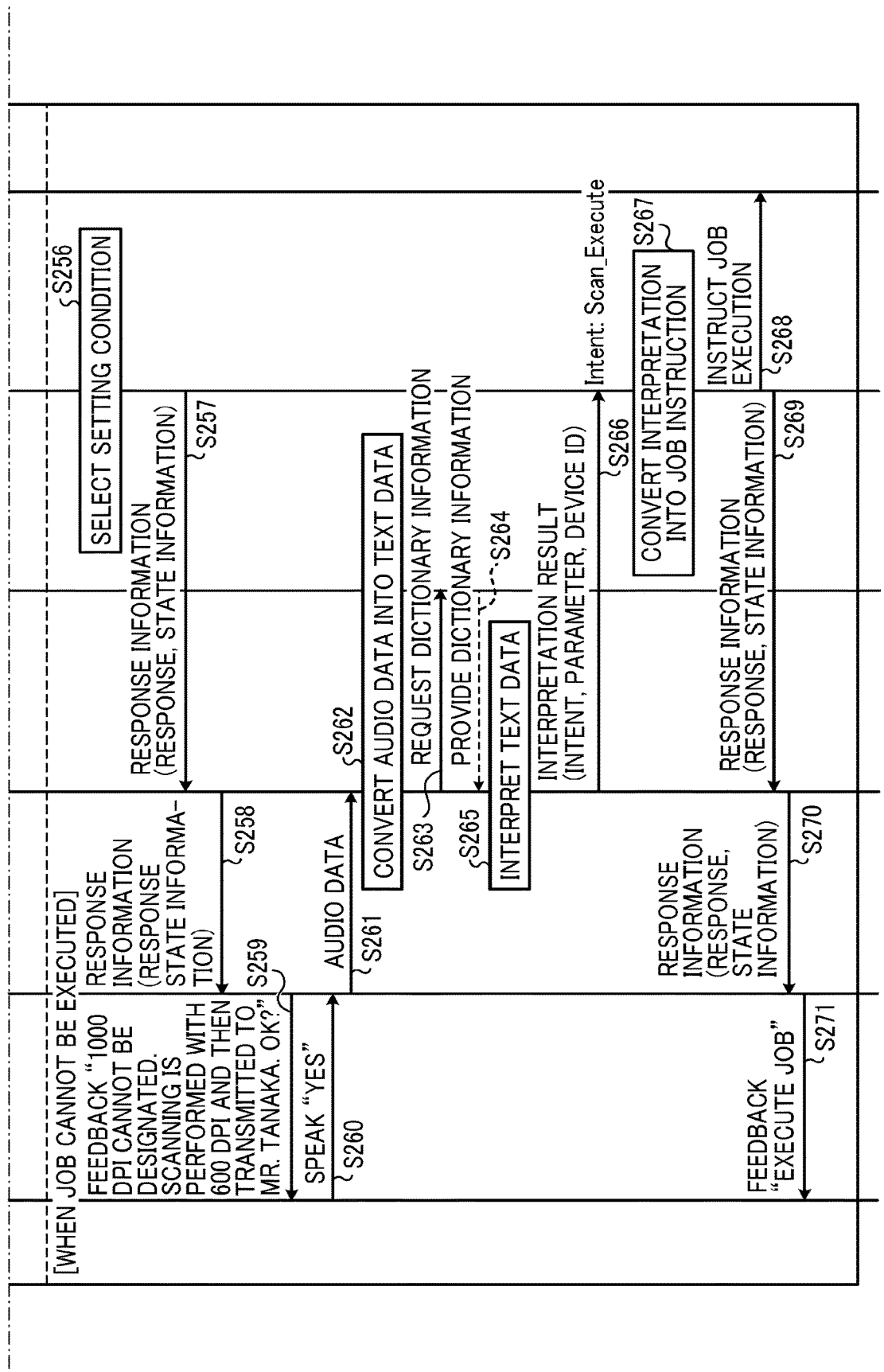

FIGS. 19A and 19B (FIG. 19) are an example of a sequence diagram of a flow of operation when the job can be executed and when the job cannot be executed by the audio-based operation system 1 according to the embodiment.

If the MFP 10 can perform the image processing with the resolution of 1000 dpi, the notification unit 335 of the management program 33 transmits the response information to the smart speaker 20 via the operation audio conversion program 31 (steps S241, S242). The response information includes a response of "scan with 1000 dpi and transmit to Mr. Tanaka. OK?"

Then, the audio feedback unit 213 of the smart speaker 20 outputs an input confirmation feedback of "scan with 1000 dpi and transmit to Mr. Tanaka. OK?" (step S243).

In response to the input confirmation feedback output by the smart speaker 20, the user speaks "YES" (step S244).

Then, the communication control unit 212 of the smart speaker 20 transmits audio data of "YES" to the cloud service apparatus 30 (step S245).

Then, the text conversion unit 312 of the operation audio conversion program 31 converts the audio data into text data (step S246).

Then, the interpretation unit 313 of the operation audio conversion program 31 interprets the text data based on the dictionary information provided by the audio assistant program 32 (steps S247, S248, S249).

Then, the interpretation unit 313 then transmits an interpretation result setting the intent of "Scan_Execute" and the parameter of "resolution=1000, transmission destination=Tanaka" to the management program 33 (step S250).

Then, the interpretation result conversion unit 331 of the management program 33 converts the interpretation result into a job instruction (step S251).

Then, the execution instruction unit 332 of the management program 33 transmits the job instruction to the MFP 10 (step S252).

Then, the management program 33 transmits response information setting a response of "execute job" to the smart speaker 20 via the operation audio conversion program 31 (steps S253, S254)

Then, the audio feedback unit 213 of the smart speaker 20 outputs the input confirmation feedback of "execute job" (step S255).

On the other hand, if the resolution of 600 dpi is the maximum resolution that can be processed by the MFP 10, the image processing using the resolution of 1000 dpi designated by the user cannot be performed by the MFP 10. In this case, the execution determination unit 334 selects a function or value closest to the function or processing capability value instructed by the user within the processing capability of the MFP 10 (step S256).

For example, if the resolution processable by the MFP 10 is in a range of 200 to 600 dpi, the execution determination unit 334 selects 600 dpi closest to the 1000 dpi instructed by the user. In other words, if the execution determination unit 334 determines that the job execution cannot be performed using the intent and parameter included in the interpretation result based on the apparatus information or apparatus state, the execution determination unit 334 selects the setting condition executable by the MFP 10 by referring to the processing capability of the MFP 10. Then, the execution determination unit 334 generates response information based on the selected setting condition.

In this case, the management program 33 can acquire the device ID identifying the smart speaker 20, which is the audio input source, in addition to the interpretation result from the operation audio conversion program 31. Accordingly, the execution determination unit 334 can determine whether or not the job can be executed by specifying or identifying the MFP 10, associated with the device ID identifying the smart speaker 20, which is acquired by referring to the association DB 35, and then by referring to the processing capability of the specified or identified MFP 10. Further, if the user instructs an execution of function that is not included in the MFP 10, the execution determination unit 334 generates response information indicating that the job cannot be executed.

Then, the notification unit 335 of the management program 33 transmits the generated response information to the smart speaker 20 via the operation audio conversion program 31 (steps S257, S258). Further, the management program 33 can transmit information about the selected setting condition to the operation audio conversion program 31.

Then, the smart speaker 20 outputs a confirmation feedback of "1000 dpi cannot be designated. Scanning is performed with 600 dpi and then transmitted to Mr. Tanaka. OK?" to the user (step S259).

Then, in response to the confirmation feedback output by the smart speaker 20 (step S259), the user speaks "YES" (step S260).

Then, the communication control unit 212 of the smart speaker 20 transmits audio data of "YES" to the cloud service apparatus 30 (step S261).

Then, the text conversion unit 312 of the operation audio conversion program 31 converts the audio data into text data (step S262).

Then, the interpretation unit 313 of the operation audio conversion program 31 interprets the text data based on the dictionary information provided by the audio assistant program 32 (steps S263, S264, S265).

Then, the interpretation unit 313 transmits an interpretation result setting the intent of "Scan_Execute" and the parameter of "resolution=600, transmission destination=Tanaka" to the management program 33 (step S266).

Then, the interpretation result conversion unit 331 of the management program 33 converts the interpretation result to a job instruction (step S267).

Then, the execution instruction unit 332 of the management program 33 transmits the job instruction to the MFP 10 (step S268).

Then, the notification unit 335 of the management program 33 transmits response information setting a response of "execute job" to the smart speaker 20 via the operation audio conversion program 31 (steps S269, S270).

Then, the audio feedback unit 213 of the smart speaker 20 outputs an input confirmation feedback of "execute job" (step S271). Thus, the MFP 10 can be operated to execute the job within the processing capability by using the audio input operation.

In this example case, by referring to an address book stored in the storage 114 included in the MFP 10, the MFP 10 searches the destination information corresponding to "Tanaka." The destination information is information, such as an e-mail address and a facsimile number (FAX number). If the destination information corresponding to "Tanaka" exists in the address book, the MFP 10 transmits the image data scanned by the MFP 10 to the destination, such as "Tanaka." Further, the MFP 10 displays the destination information on the display 103 and demands or prompts the user to check or confirm whether the destination information has an error or not. Further, when the user selects to press an OK button, the scanned image data is transmitted to the destination. Further, if multiple addresses corresponding to "Tanaka" exist in the address book, the MFP 10 can display all the relevant destination information on the display 103 of the MFP 10 and allow the user to select the address.

Figure 20B:
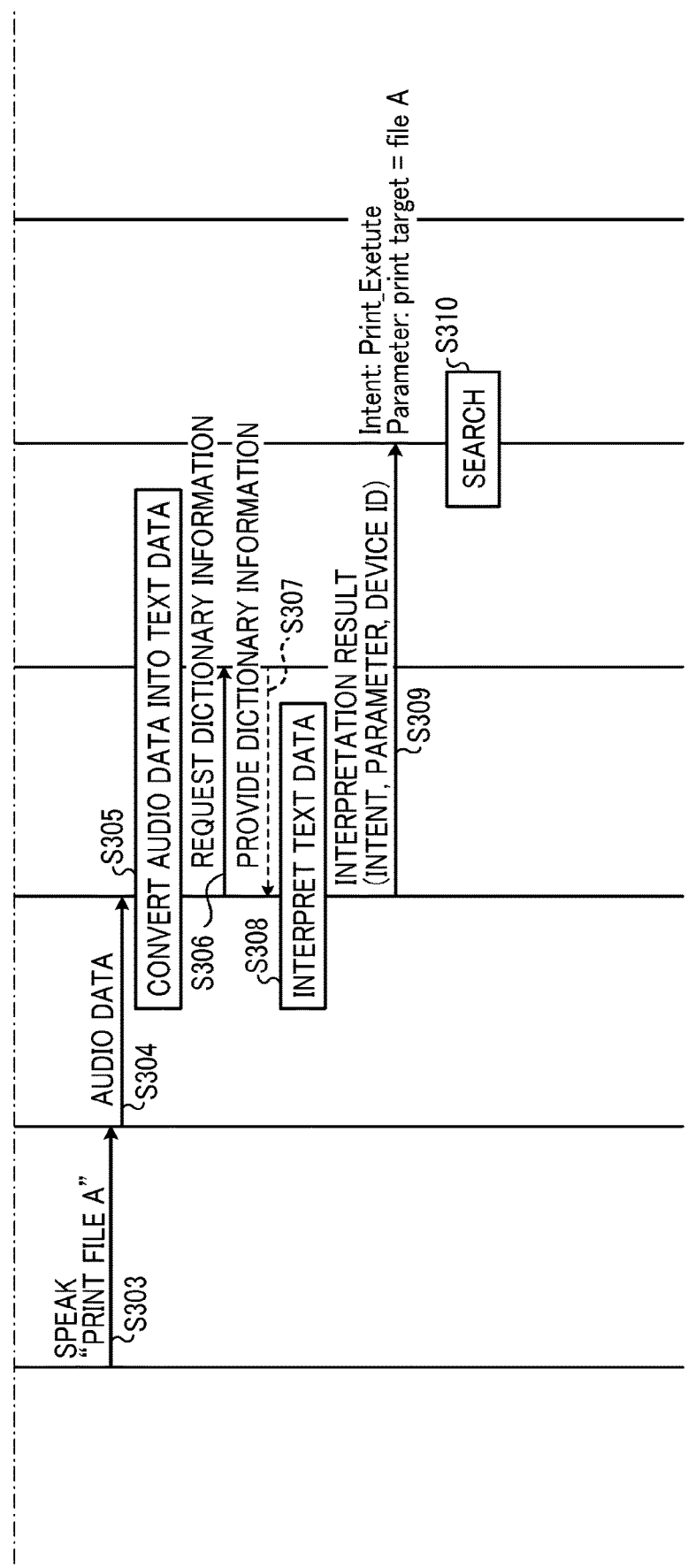

Operation of Printing Searched File:

Hereinafter, a description is given of an operation of printing a desired file with reference to FIG. 20. FIGS. 20A and 20B (FIG. 20) are an example of a sequence diagram of a flow of a search processing by audio-based operation executed by the audio-based operation system 1 according to the embodiment.

After activating the operation audio processing program 21 of the smart speaker 20, a user instructs an activation of the audio assistant program 32 by speaking something, which is an audio input by the user (step S291). Then, the processing similar to steps S21 to S35 in FIG. 12 is performed.

Then, the audio feedback unit 213 of the smart speaker 20 outputs, for example, an audio feedback of "copy or scan?" for demanding or prompting the user to enter or input a job instruction (step S292). Then, the user speaks "print" (step S293).

Then, the communication control unit 212 of the smart speaker 20 transmits audio data of "print" to the cloud service apparatus 30 (step S294).

Then, the text conversion unit 312 of the operation audio conversion program 31 converts the audio data into text data (step S295).

Then, the interpretation unit 313 of the operation audio conversion program 31 interprets the text data based on the dictionary information provided by the audio assistant program 32 (steps S296, S297, S298)

Then, the interpretation unit 313 transmits an interpretation result setting the intent of "Print_Execute" to the management program 33 (step S299).

Since the "print" instruction alone lacks the required parameter, the notification unit 335 of the management program 33 transmits response information setting a response of "input setting value" to the smart speaker 20 via the operation audio conversion program 31 (steps S300, S301).

Then, the audio feedback unit 213 of the smart speaker 20 outputs "input setting value" as an input insufficient feedback (step S302).

Then, in response to receiving the input insufficient feedback output by the smart speaker 20, the user speaks "print file A" (step S303).

Then, the communication control unit 212 of the smart speaker 20 transmits audio data of "print file A" to the cloud service apparatus 30 (step S304).

Then, the text conversion unit 312 of the operation audio conversion program 31 converts the audio data into text data (step S305).

Then, the interpretation unit 313 of the operation audio conversion program 31 interprets the text data based on the dictionary information provided by the audio assistant program 32 (steps S306, S307, S308).

Then, the interpretation unit 313 transmits an interpretation result setting the intent of "Print_Exetute" and the parameter of "print target=file A" to the management program 33 (step S309).

Then, the search unit 337 of the management program 33 searches or retrieves the file A from the management DB 34 based on the parameter included in the interpretation result (step S310). The search target may not be limited to the management DB 34, but may be a server connected via the cloud service apparatus 30 and the network 50. Further, the search unit 337 may search a file having a file name including a character string included in the parameter, and also search a file including a character string, included in the parameter, in the file data. Further, the search unit 337 may also search a file based on the attribute of file, such as file creation date and time, file creator, or the like.

Figure 21B:
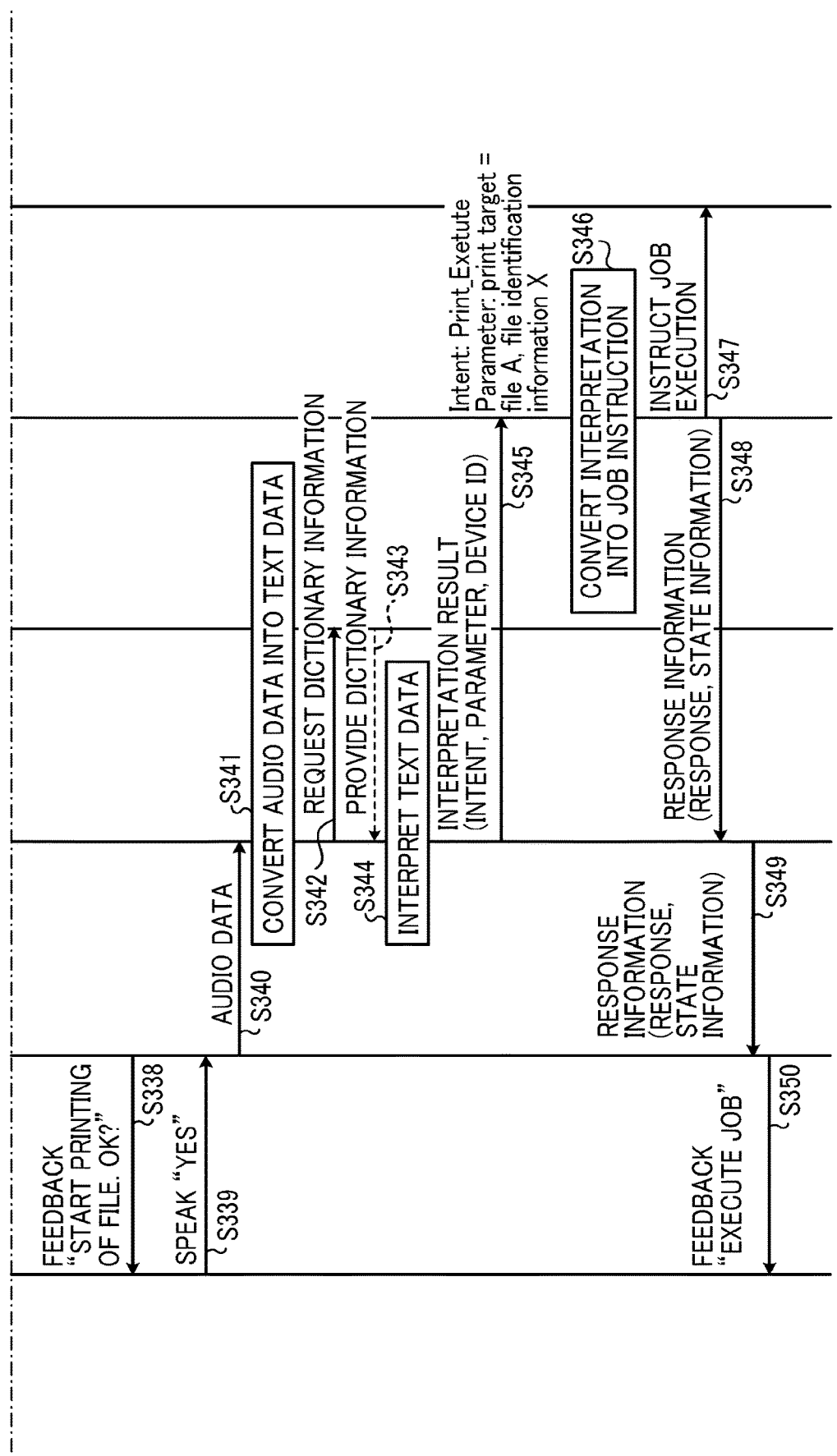

FIGS. 21A and 21B (FIG. 21) are an example of a sequence diagram of a flow of a printing process by audio-based operation executed by the audio-based operation system 1 according to the embodiment.

If only one file A is stored in the management DB 34, the search unit 337 sets the file A as print target data (step S331). Further, the notification unit 335 transmits response information setting a response of "start printing of file. OK?" to the smart speaker 20 via the operation audio conversion program 31.

If two or more files A are stored in the management DB 34, the search unit 337 searches and finds a plurality of files as a search result. In this case, the notification unit 335 transmits response information setting a response of "two or more files A are registered. Select print target data" to the smart speaker 20 via the operation audio conversion program 31 (steps S332, S333). In this case, the notification unit 335 may include the file creation date and time, file creator, thumbnail image or the like in the response information as information identifying each of the respective files.

Then, the audio feedback unit 213 of the smart speaker 20 outputs an input insufficient feedback of "two or more files A are registered. Select print target data" (step S334). At this stage, the audio feedback unit 213 may provide the file creation date and time and file creator as the information identifying each of the respective files, and/or may display the file list on the touch panel 207. Further, the audio feedback unit 213 may display the thumbnail images as the file list to demand or prompt the user to select a desired file.

In response to the input insufficient feedback output by the smart speaker 20 (step S334), the user selects a desired file A. That is, the user can select the desired file by speaking the file creation date and time and/or the file creator, or the user can select the desired file by touching the desired file in the file list displayed on the touch panel 207. To be described later, the execution instruction unit 332 transmits the file A selected by the user to the MEP 10 and requests the printing.

If the file A is not stored in the management DB 34, the notification unit 335 transmits response information setting a response of "file A is not registered" to the smart speaker 20 via the operation audio conversion program 31 (steps 335, S336).

Then, the audio feedback unit 213 of the smart speaker 20 outputs an audio feedback of "file A is not registered" (step S337).

Then, if only one file A exists in the management DB 34 and the file A is selected as a desired file to be printed, or if the other file is selected, the notification unit 335 transmits response information to the smart speaker 20. That is, the notification unit 335 transmits the response information setting a response of "start printing of file. OK?" to the smart speaker 20 via the operation audio conversion program 31.

Then, the audio feedback unit 213 of the smart speaker 20 outputs, for example, a confirmation feedback of "start printing of file. OK?" (step S338).

In response to the confirmation feedback output by the smart speaker 20, the user speaks "YES" (step S339).

Then, the communication control unit 212 of the smart speaker 20 transmits audio data of "YES" to the cloud service apparatus 30 (step S340).

Then, the text conversion unit 312 of the operation audio conversion program 31 converts the audio data into text data (step S341).

Then, the interpretation unit 313 of the operation audio conversion program 31 interprets the text data based on the dictionary information provided by the audio assistant program 32 (steps 342, S343, S344).

Then, the interpretation unit 313 sets an interpretation result setting the intent of "Print_Exetute" and the parameter of "print target=file A, file identification information X" to the management program 33 (step S345). The file identification information X is added as information for identifying the file A selected by the user when two or more files A exist in the management DB 34. The file identification information X includes, for example, information of file creation date and/or file creator, or the like.

Then, the interpretation result conversion unit 331 of the management program 33 converts the interpretation result into a job instruction (step S346).

Then, the notification unit 335 transmits the job instruction to the MFP 10 with the file selected by the user (step S347). In this way, the MFP 10 prints the file desired by the user.

Further, the management program 33 transmits response information setting a response of "execute job" to the smart speaker 20 via the operation audio conversion program 31 (steps 348, S349).

Then, the audio feedback unit 213 of the smart speaker 20 outputs an input confirmation feedback of "execute job" (step S350).

In the above description, the print target is searched by the cloud service apparatus 30 and the searched file is transmitted to the MFP 10, but is not limited thereto. For example, the cloud service apparatus 30 can be configured to transmit a job instruction setting "print target=file A" to the MFP 10 so that the MFP 10 can search the file A. In this case, the MFP 10 searches the file A from the storage 114 included in the MFP 10 or a server connected to the MFP 10 via the network 50. Further, if two or more files are searched, the MFP 10 displays a file list on the touch panel 207 and demands or prompts the user to select the file. Then, the MFP 10 sets the file selected by the user as a target of job execution.

Changing of Language Displayed on MFP:

Hereinafter, a description is given of changing a language type used for a screen displayed on the display 103 of the MFP 10 with reference to FIG. 22.

Figure 22:
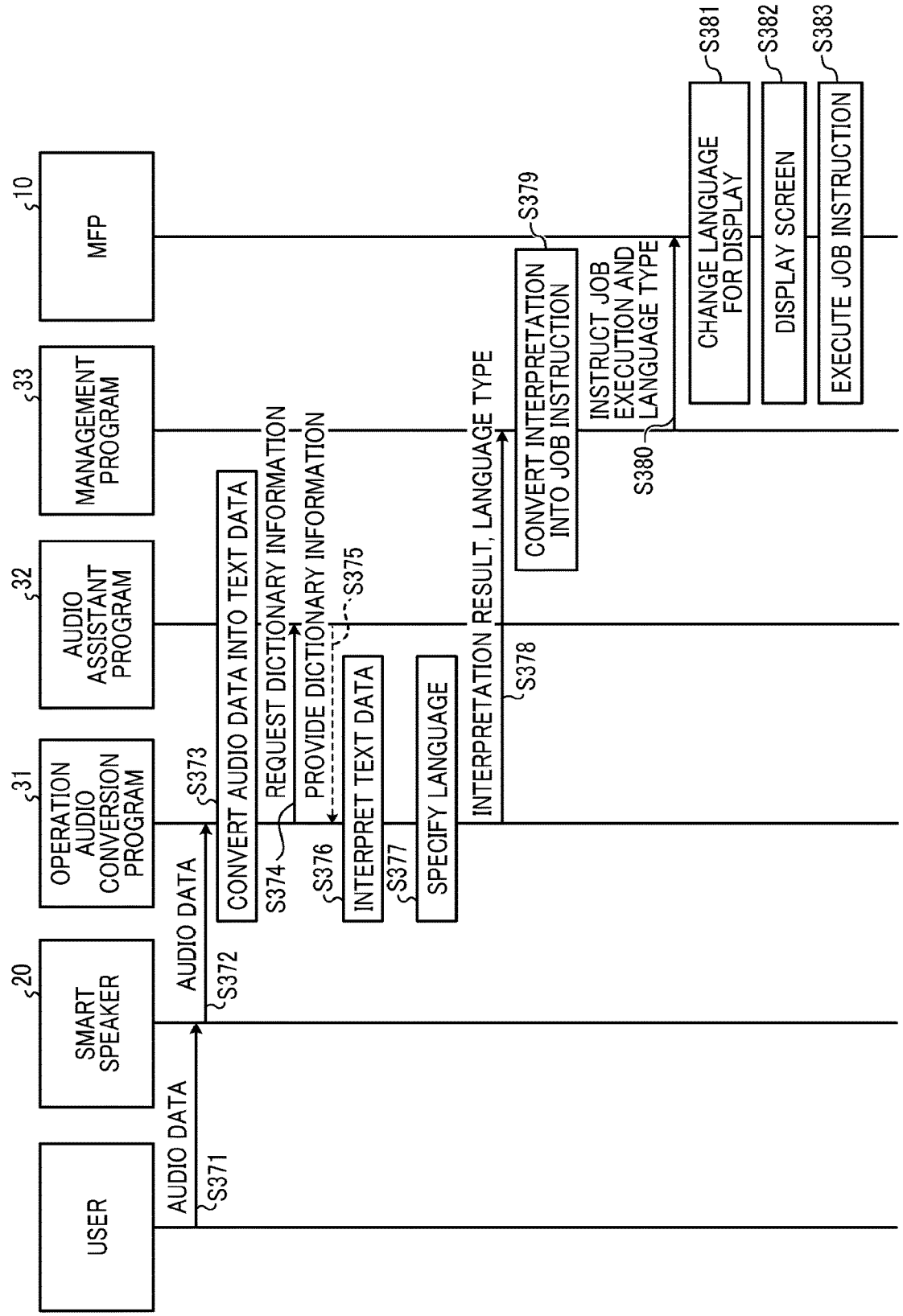
FIG. 22 is an example of a sequence diagram of a flow of a display language change processing by audio-based operation executed by the audio-based operation system according to the embodiment.

FIG. 22 is an example of a sequence diagram of a flow of a display language change processing by audio-based operation executed by the audio-based operation system 1 according to the embodiment.

A user speaks a phrase in a specific language set for the smart speaker 20 (step S371). That is, the user speaks the phrase in the specific language interpretable by the smart speaker 20.

Then, the communication control unit 212 of the smart speaker 20 transmits audio data of the spoken phrase to the cloud service apparatus 30 (step S372).

Then, the text conversion unit 312 of the operation audio conversion program 31 converts the audio data into text data (step S373).

Then, the interpretation unit 313 of the operation audio conversion program 31 interprets the text data based on the dictionary information provided by the audio assistant program 32 (steps 374, S375, S376).

Then, the language specifying unit 315 of the operation audio conversion program 31 specifies or identifies a specific language type interpretable at the smart speaker 20 as the language setting (step S377).

Then, the interpretation unit 313 transmits the interpretation result and the specified or identified specific language type to the management program 33 (step S378).

Then, the interpretation result conversion unit 331 of the management program 33 converts the interpretation result into a job instruction (step S379).

Then, the execution instruction unit 332 of the management program 33 transmits the job instruction and the specific language type transmitted from the operation audio conversion program 31 to the MFP 10 (step S380).

Then, the language setting unit 123 of the MFP 10 changes the language used for various screens to be displayed on the display 103 of the MFP 10 to a specific language specified by the specific language type received from the management program 33 (step S381).

Then, the display control unit 124 displays a screen described in the specific language specified by the language type set by the language setting unit 123 (step S382). In this case, the display control unit 124 displays the screen described in the specific language specified by the specific language type received from the management program 33.

Then, the job execution unit 122 executes a job instruction received from the management program 33 (step S383).

As to the above described audio-based operation system 1, the smart speaker 20 receives the audio-based operation used for operating the MFP 10. The smart speaker 20 transmits the audio data related to the received audio-based operation to the cloud service apparatus 30. The cloud service apparatus 30 interprets the audio data and generates a job to be executed by the MFP 10. Further, the cloud service apparatus 30 transmits the generated job to the MFP 10. Then, the MFP 10 performs the received job. Therefore, the manual operation can be omitted in the audio-based operation system 1, with which the operability can be improved.

Further, the MFP 10 displays a screen on the display 103 using the specific language type related to the audio-based operation received by the smart speaker 20. Therefore, even if the language setting of the smart speaker 20 and the language setting of the MFP 10 differ, the audio-based operation system 1 can reflect the specific language type spoken for the audio-based operation.

Modified Example 1

In the above described embodiment, the language type used for the screen displayed on the display 103 of the MFP 10 is changed based on the language setting in the smart speaker 20. In modified example 1, the language type associated with an activation phrase (e.g., activation word, term) spoken by a user is extracted based on activation language association information indicating a relationship between the activation phrase (e.g., activation word, term) and the language type. Then, the MFP 10 changes the language type used for the screen displayed on the display 103 to a specific language type extracted from the activation language association information.

Figure 23:
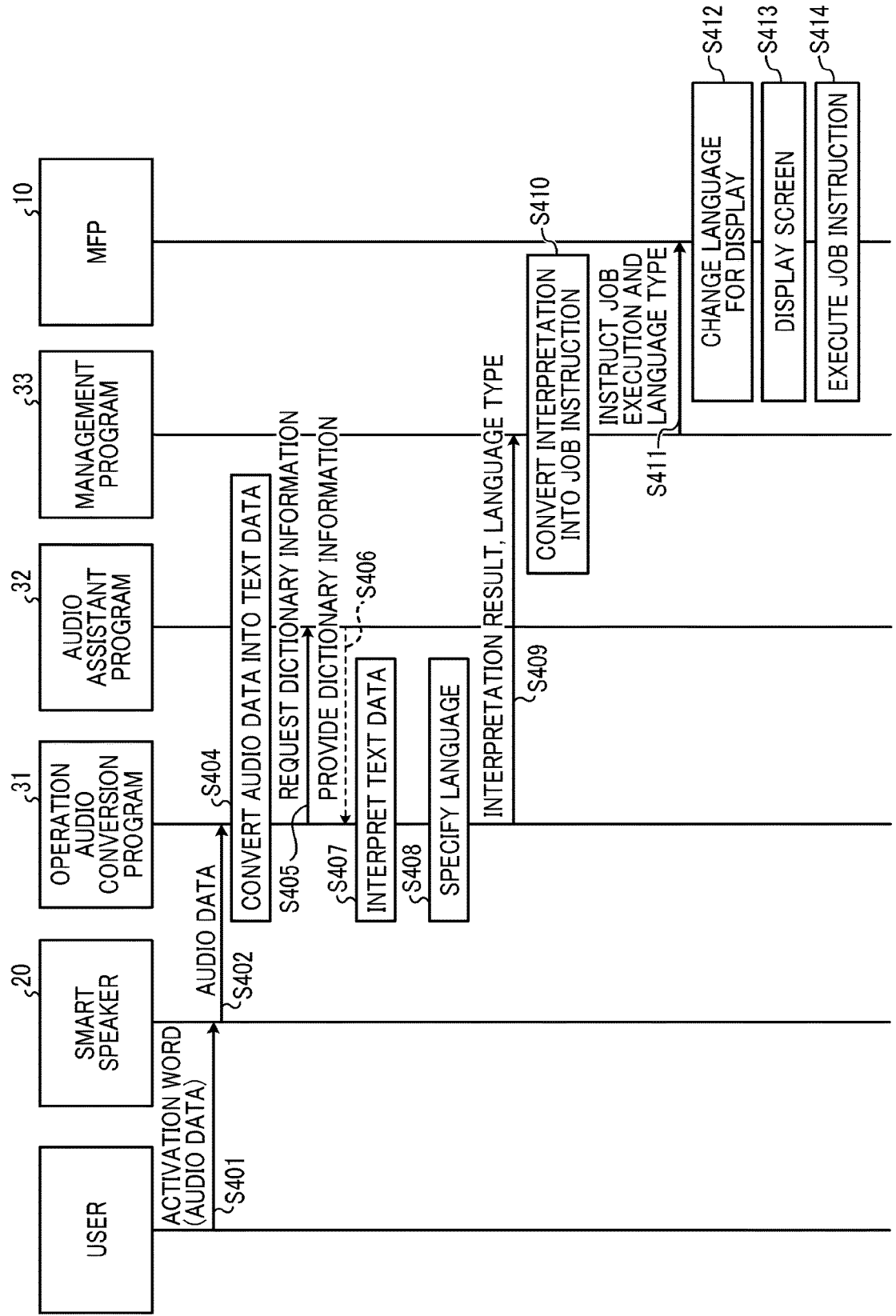
FIG. 23 is an example of a sequence diagram of a flow of a display language change processing by audio-based operation executed by an audio-based operation system according to modified example 1.

FIG. 23 is an example of a sequence diagram of a flow of a display language change processing by audio-based operation executed by the audio-based operation system 1 according to the modified example 1.

A user speaks an activation phrase that activates the smart speaker 20 in any language (step S401). For example, Japanese activation phrase is "hei" and English activation phrase is "Hi." The activation of the smart speaker 20 means the smart speaker 20 is set into an interactive operation state.

Then, the communication control unit 212 of the smart speaker 20 transmits audio data of the activation phrase to the cloud service apparatus 30 (step S402). That is, the communication control unit 212 transmits the audio data of the activation phrase spoken by the user in any language to the cloud service apparatus 30.

Then, the text conversion unit 312 of the operation audio conversion program 31 converts the audio data into text data (step S404).

Then, the interpretation unit 313 of the operation audio conversion program 31 interprets the text data based on the dictionary information provided by the audio assistant program 32 (steps 405, S406, S407).

Then, the language specifying unit 315 specifies or identifies a specific language type used for the activation phrase (step S408). Specifically, for example, the storage 304 stores the activation language association information associating phrases, such as activation phrases, and language types. Then, the interpretation unit 313 extracts the specific language type associated with the activation phrase based on the activation language association information. Thus, the language specifying unit 315 specifies or identifies the specific language type used for the activation phrase.

Then, the interpretation unit 313 transmits the interpretation result and the specified or identified specific language type to the management program 33 (step S409).

Then, the interpretation result conversion unit 331 of the management program 33 converts the interpretation result into a job instruction (step S410).

Then, the execution instruction unit 332 of the management program 33 transmits, to the MFP 10, the job instruction and the specific language type transmitted from the operation audio conversion program 31 (step S411).

Then, the language setting unit 123 of the MFP 10 changes the language used for various screens displayed on the display 103 to the specific language indicated by the specific language type received from the management program 33 (step S412).

Then, the display control unit 124 displays a screen described in the specific language specified by the specific language type set by the language setting unit 123 (step S413). In this case, the display control unit 124 displays a screen described in the specific language specified by the specific language type received from the management program 33.

Then, the job execution unit 122 executes the job instruction received from the management program 33 (step S414).

As described above, as to the audio-based operation system 1 according to the modified example 1, the language setting of the MFP 10 can be changed based on the activation phrase. Therefore, even if the language setting of the smart speaker 20 and the language setting of the MFP 10 differ, the audio-based operation system 1 can reflect the specific language type spoken for the audio-based operation.

Modified Example 2

In the above described embodiment, the language used for the screen displayed on the display 103 of the MFP 10 is changed based on the language setting set for the smart speaker 20. In modified example 2, based on apparatus language association information storing smart device identification information identifying the smart speaker 20 and the language type in association with each other, a specific language type specified or identified by the smart device identification information indicating the smart speaker 20 that has received the audio-based operation is extracted. Then, the MFP 10 changes the language used for the screen displayed on the display 103 to the specific language extracted from the activation language association information.

Figure 24:
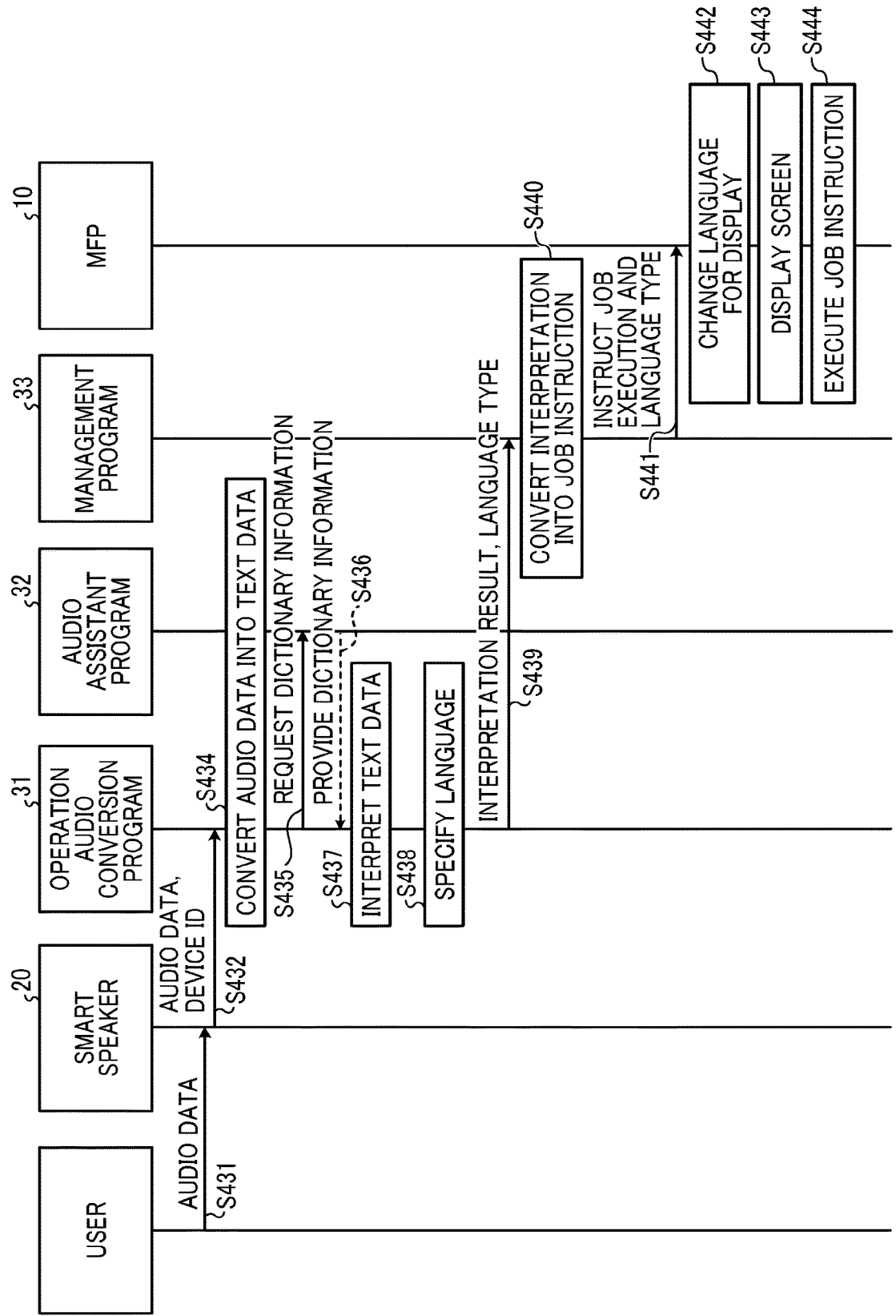
FIG. 24 is an example of a sequence diagram of a flow of a display language change processing by audio-based operation executed by an audio-based operation system according to modified example 2.

FIG. 24 is an example of a sequence diagram of a flow of a display language change processing by audio-based operation executed by the audio-based operation system 1 according to the modified example 2.

A user speaks an activation phrase, such as an activation word (step S431). Further, the activation phrase is not limited to the activation word, but the user can speak any phrase.

Then, the communication control unit 212 of the smart speaker 20 transmits audio data of the activation phrase to the cloud service apparatus 30 (step S432).

Then, the text conversion unit 312 of the operation audio conversion program 31 converts the audio data into text data (step S434).

Then, the interpretation unit 313 of the operation audio conversion program 31 interprets the text data based on the dictionary information provided by the audio assistant program 32 (steps 435, S436, S437).

Then, based on the apparatus language association information storing the smart device identification information identifying the smart speaker 20 and the language type in association with each other, the language specifying unit 315 identifies a specific language type based on the received smart device identification information (step S438). Specifically, for example, the storage 304 stores the apparatus language association information associating the smart device identification information identifying the smart speaker 20 (e.g., device ID) and the language type in association with each other. Then, the interpretation unit 313 extracts a specific language type associated with the smart device identification information based on the activation language association information. Thus, the interpretation unit 313 specifies the specific language type associated with the smart speaker 20.

Then, the interpretation unit 313 transmits the interpretation result and the specified or identified specific language type to the management program 33 (step S439).

Then, the interpretation result conversion unit 331 of the management program 33 converts the interpretation result into a job instruction (step S440).

Then, the execution instruction unit 332 of the management program 33 transmits the job instruction and the specific language type transmitted from the operation audio conversion program 31 to the MFP 10 (step S441).

Then, the language setting unit 123 of the MFP 10 changes the language used for various screens displayed on the display 103 to the specific language indicated by the specific language type received from the management program 33 (step S442).

Then, the display control unit 124 displays a screen described in the specific language specified by the specific language type set by the language setting unit 123 (step S443). In this case, the display control unit 124 displays a screen described in the specific language specified by the specific language type received from the management program 33.

Then, the job execution unit 122 executes the job instruction received from the management program 33 (step S444).

As described above, as to the audio-based operation system 1 according to the modified example 2, the language setting of the MFP 10 is changed based on the smart speaker 20. Therefore, even if the language setting of the smart speaker 20 and the language setting of the MFP 10 differ, the audio-based operation system 1 can reflect the specific language type spoken for the audio-based operation.

Conventionally, image forming apparatuses cannot receive an operation from smart speakers, and improvement in operability is desired.

As to the above described one or more embodiments of the audio-based operation system, the audio-based operation method, and the audio-based operation program, the operability can be improved.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An audio-based operation system comprising:
an audio input-output device that receives an audio-based operation performed by a user;
a server that receives an instruction corresponding to the audio-based operation received by the audio input-output device;
an image forming apparatus that executes a job transmitted from the server;
wherein the server includes circuitry configured to:
receive audio-based operation information indicating the audio-based operation received by the audio input-output device;
convert the received audio-based operation information into a job interpretable by the image forming apparatus;
instruct the image forming apparatus to execute the job converted from the audio-based operation information; and
display, on a display provided for the image forming apparatus, a screen described in a language used for the audio-based operation,
wherein a memory stores information associating device identification information identifying the audio input-output device with languages used for the audio-based operation,
wherein the circuitry displays, on the display provided for the image forming apparatus, the screen described in a given language specified by the device identification information identifying the audio input-output device that receives the audio-based operation based on the information associating the device identification information with the languages.

2. The audio-based operation system according to claim 1, wherein the memory stores information associating one or more phrases and one or more language types,
wherein the circuitry displays, on the display provided for the image forming apparatus, the screen described in a specific language specified by any one of the phrases used for the audio-based operation.

3. The audio-based operation system according to claim 2, wherein the memory further stores one or more particular phrases used for activating the audio input-output device and the one or more language types in association with each other,
wherein the circuitry displays, on the display provided for the image forming apparatus, the screen described in a specific language specified by any one of the particular phrases used for activating the audio input-output device.

4. The audio-based operation system according to claim 2, wherein the server includes the memory.

5. A method of processing information using an audio-based operation, comprising:
receiving audio-based operation information indicating an audio-based operation received by an audio input-output device;
converting the received audio-based operation information into a job interpretable by an image forming apparatus;
instructing the image forming apparatus to execute the job converted from the audio-based operation information;
displaying, on a display provided for the image forming apparatus, a screen described in a language used for the audio-based operation;
storing, in a memory, information associating device identification information identifying the audio input-output device with languages used for the audio-based operation;
displaying, on the display provided for the image forming apparatus, the screen described in a given language specified by the device identification information identifying the audio input-output device that receives the audio-based operation based on the information associating the device identification information with the languages.

6. The method according to claim 5, further comprising:
storing, in the memory, information associating one or more phrases and one or more language types; and
displaying, on the display provided for the image forming apparatus, the screen described in a specific language specified by any one of the phrases used for the audio-based operation.

7. The method according to claim 6, further comprising:
storing, in the memory, one or more particular phrases used for activating the audio input-output device and the one or more language types in association with each other; and
displaying, on the display provided for the image forming apparatus, the screen described in a specific language specified by any one of the particular phrases used for activating the audio input-output device.

8. A non-transitory computer readable storage medium storing one or more instructions that, when performed by one or more processors, cause the one or more processors to execute a method of processing information using an audio-based operation, the method comprising:
receiving audio-based operation information indicating an audio-based operation received by an audio input-output device;
converting the received audio-based operation information into a job interpretable by an image forming apparatus;
instructing the image forming apparatus to execute the job converted from the audio-based operation information;
displaying, on a display provided for the image forming apparatus, a screen described in a language used for the audio-based operation;
storing, in a memory, information associating device identification information identifying the audio input-output device with languages used for the audio-based operation;
displaying, on the display provided for the image forming apparatus, the screen described in a given language specified by the device identification information identifying the audio input-output device that receives the audio-based operation based on the information associating the device identification information with the languages.

9. The non-transitory computer readable storage medium according to claim 8, further comprising:
storing, in the memory, information associating one or more phrases and one or more language types; and
displaying, on the display provided for the image forming apparatus, the screen described in a specific language specified by any one of the phrases used for the audio-based operation.

10. The non-transitory computer readable storage medium according to claim 9, further comprising:
storing, in the memory, one or more particular phrases used for activating the audio input-output device and the one or more language types in association with each other; and
displaying, on the display provided for the image forming apparatus, the screen described in a specific language specified by any one of the particular phrases used for activating the audio input-output device.

* * * * *